(12) United States Patent
Schoen et al.

(10) Patent No.: US 8,405,258 B2
(45) Date of Patent: Mar. 26, 2013

(54) MACHINE TOOL WITH AN ACTIVE ELECTRICAL GENERATOR FOR POWER GENERATION

(75) Inventors: Ludwig Schoen, Ludwigsburg (DE); Florian Esenwein, Uhingen-Holzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 13/031,483

(22) Filed: Feb. 21, 2011

(65) Prior Publication Data

US 2011/0204787 A1 Aug. 25, 2011

(30) Foreign Application Priority Data

Feb. 22, 2010 (DE) .......................... 10 2010 002 185

(51) Int. Cl.
*H02K 7/14* (2006.01)
(52) U.S. Cl. ........................................ 310/47; 310/192
(58) Field of Classification Search .................... 310/47, 310/168, 192
See application file for complete search history.

(56) References Cited

U.S. PATENT DOCUMENTS

| | | | |
|---|---|---|---|
| 5,184,040 A * | 2/1993 | Lim ............................. | 310/114 |
| 6,037,696 A * | 3/2000 | Sromin et al. ................ | 310/268 |
| 6,140,931 A * | 10/2000 | Yamane et al. ............ | 340/686.6 |
| 7,911,090 B2 * | 3/2011 | Schoen et al. ................ | 310/50 |
| 8,084,900 B2 * | 12/2011 | Schoen et al. ................ | 310/50 |
| 2007/0086756 A1 * | 4/2007 | Rimondi ....................... | 392/386 |
| 2011/0204786 A1 * | 8/2011 | Schoen et al. ................ | 315/76 |

FOREIGN PATENT DOCUMENTS

DE 10 2006 045 157 4/2008

* cited by examiner

*Primary Examiner* — Thanh Lam
(74) *Attorney, Agent, or Firm* — Maginot, Moore & Beck

(57) ABSTRACT

A machine tool with a generator for generating electrical power is disclosed. The generator has a stator with a coil and a rotor with a magnet. The rotor is capable of moving relative to the stator. An air gap is formed between the rotor and the stator. The stator and the rotor comprise a material with a relative permeability greater than the relative permeability of air and are arranged in such a way that magnetic lines of force of the magnet are guided in a targeted manner with respect to the coil. The air gap between the stator and the rotor is configured in such a way that a large proportion of the lines of force emanating from the magnet are guided by the stator and the rotor.

12 Claims, 24 Drawing Sheets

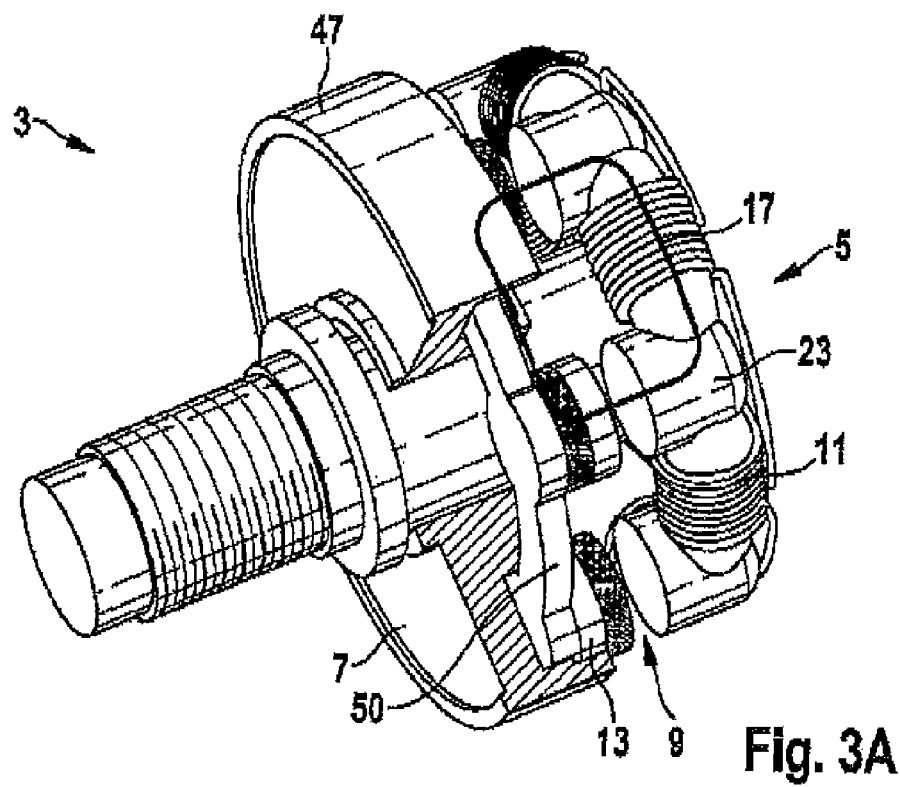
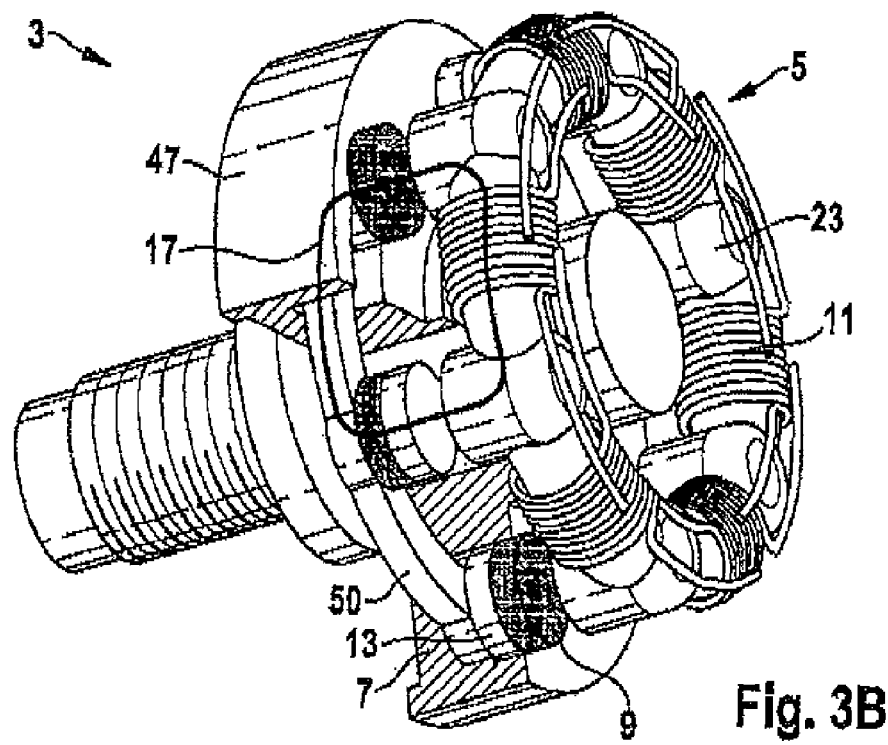

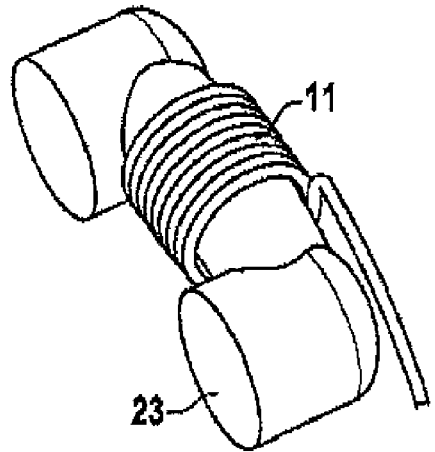
Fig. 5A
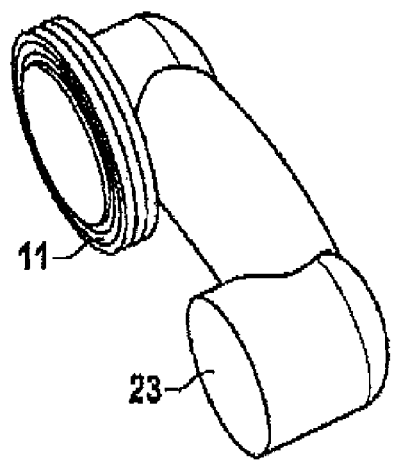
Fig. 5B
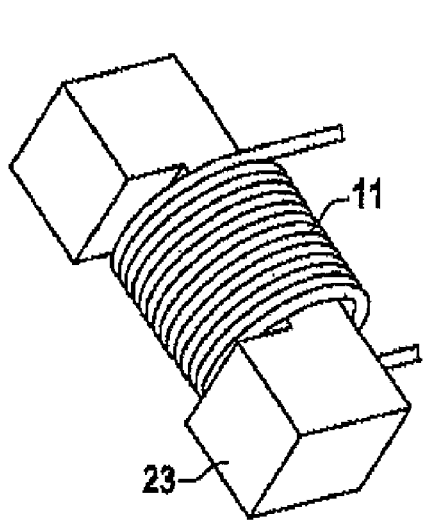
5C
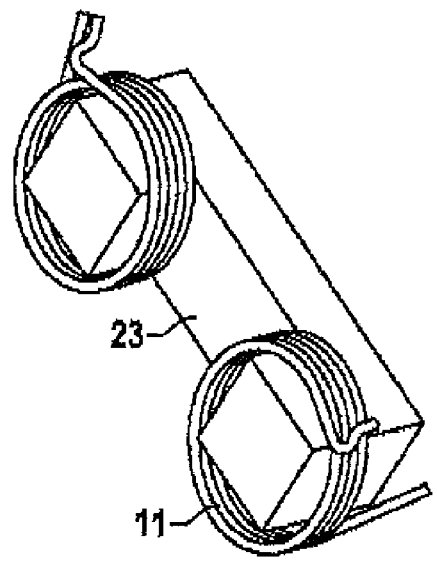
Fig. 5D

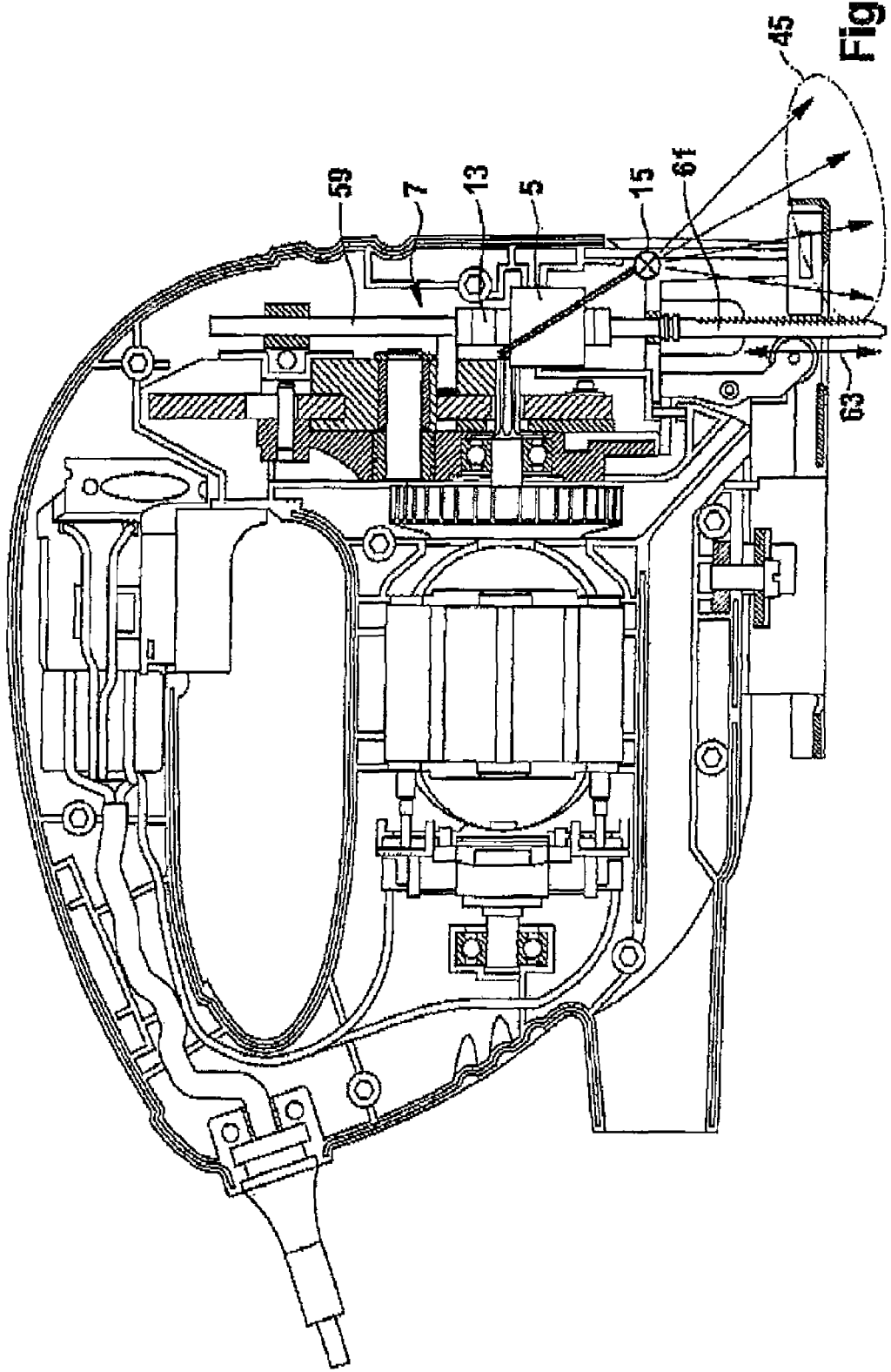

MACHINE TOOL WITH AN ACTIVE ELECTRICAL GENERATOR FOR POWER GENERATION

This application claims priority under 35 U.S.C. §119 to German patent application no. 10 2010 002 185.7, filed Feb. 22, 2010, the disclosure of which is incorporated herein by reference in its entirety.

Cross Reference is made to copending U.S. patent application Ser. No. 13/031,315, entitled "Machine Tool with an Electrical Generator for Passive Power Generation," filed on Feb. 21, 2011.

The present disclosure relates to a machine tool with an active electrical generator for power generation.

BACKGROUND

When working with electric tools, auxiliary means are often required for optimizing the performance of work. For example, illumination of the working area by means of light-emitting means may be useful.

DE 10 2006 045 157 A1, for example, has disclosed tools in which the light-emitting means are integrated in the tool. However, the supply of energy to the light-emitting means can pose a problem.

SUMMARY

An object of the present disclosure can therefore be considered that of providing an improved machine tool which enables a supply of energy to additional elements.

This object can be achieved by the subject matter of the present disclosure. Advantageous embodiments of the present disclosure are described herein.

Features, details and possible advantages of an apparatus in accordance with the embodiments of the disclosure will be discussed in detail below.

In accordance with a first aspect of the present disclosure, a machine tool, such as a handheld machine tool, for example, with a generator which generates electrical energy or power is described. The generator has a stator with at least one coil, for example an induction coil, and a rotor with at least one magnet, for example a permanent magnet and/or an electromagnet. The stator and the rotor comprise materials which have a relative permeability $\mu$ equal to 1, greater than 1 and preferably substantially greater than 1 ($\mu \gg 1$), i.e. the materials are paramagnetic or preferably ferromagnetic. Such materials can be, for example, steel, iron, cobalt, nickel and combinations thereof. The stator and the rotor can for the most part or completely consist of these materials. An air gap is located between the rotor and the stator, said air gap being dimensioned so as to be so small that a movement of the rotor and the stator relative to one another is only just possible. Owing to the configuration of the generator with materials with high relative permeability and an air gap which is as small as possible, it is possible to ensure that a large proportion of the magnetic lines of force which emanate from the magnet of the rotor are guided in a targeted manner with respect to or through the turns of the coil of the stator. In this case, a large proportion is, for example, 50%, preferably 70%, further preferably more than 90% or more than 99% of the lines of force.

Here, magnetic lines of force are imaginary, closed lines which, at any point in the field, illustrate the direction and intensity of the magnetic field or of the magnetic flux. The air gap can represent the air-filled space between the rotor and the stator. The maximum or average distance between the stator and the rotor can be approximately 0.5 to 2 mm, for example.

In the generator according to the disclosure, therefore, the lines of force guided in a targeted manner (i.e. the so-called useful flux of the magnet which has considerably greater intensity) are advantageously used for operating the generator and only a small proportion (the so-called leakage flux) is output into the air gap. This provides a cost-saving and space-saving option for an energy source for machine tool-internal components, such as light sources, for example.

This additional energy source can be designed to be independent of the mains supply, with the result that no additional elements for rectification and transformation of the mains current need to be installed in the machine. This may be advantageous in particular in the case of handheld machine tools since a weight saving can also be made. In addition, the electrical circuit of the generator according to the disclosure can be designed for operation on a low voltage (for example less than 50 V) and is therefore not subject to the requirements for mains-operated machines, such as the maintenance of insulation gaps, for example. This provides greater freedom in terms of the structural design of the machine tool.

In accordance with one exemplary embodiment, the rotor can be coupled to the output drive of the machine tool mechanically in a force-fitting, form-fitting and/or frictionally engaged manner or can be formed as part of the output drive or integrated therein. This can be seen, for example, by the change of existing parts of the output drive and can thus be implemented in a cost-saving manner. The output drive can be part of the machine which outputs power and can be, for example, a spindle, a ring gear, an accommodating flange or a tool receptacle, a motor shaft or the protrusion thereof.

In accordance with a further exemplary embodiment, the generator can have a second circuit which is electrically isolated from or independent of the first circuit of the machine. The first circuit is connected, for example, to a mains supply or a rechargeable battery supply. The second circuit can generate a voltage which is different from the first circuit by the operation of the generator. As a result, for example, a machine-internal light source, for example, can be supplied with energy without a mains voltage needing to be transformed and rectified. It is thus possible to dispense with additional components and therefore to save installation space and considerable additional costs.

In accordance with further exemplary embodiments, the machine tool can have one or more light sources. The light source is supplied with energy by the generator according to the disclosure and is connected thereto, for example directly or via an electrical transducer. In addition, the light source can be integrated directly into the machine or arranged thereon and can be a light source which enables possibly continuous illumination of a working area during operation of the machine. An additional light source can output a light signal, for example by means of changing color or by means of a change in intensity and therefore indicate a present rotation speed of the rotor. It is thus possible to signal that specific rotation speeds are being passed through, exceeded and/or undershot, for example in the event of an overload, and an overtravel of the rotor or the motor even once the machine has been disconnected. Furthermore, the light source can emit a flashing signal, for example. In addition, for example, an additional light source can be configured as a laser light source for labeling the working area and guiding the machine.

In accordance with a further exemplary embodiment, the machine tool has an electrical energy store, such as a capacitor and/or a rechargeable battery, for example. By virtue of the electrical energy store, it is possible, for example, for the persistence time and intensity of the light source to be improved. The electrical energy store can be integrated, for example, in electronics of the machine. In the electronics, the electrical voltage generated can be matched to the requirements of the light source.

In accordance with a further exemplary embodiment, the coil or a plurality of coils of the stator is or are arranged at or on a yoke which intensifies the magnetic flux. In addition, in the case of a plurality of magnets on the rotor for targeted guidance of the magnetic lines of force, a so-called magnetic return yoke can be arranged between the magnets. The magnet return yoke can have a higher magnetic permeability than the material of the rotor. Owing to this intensification of the flux, a sufficient voltage, for example for operation of light sources, can also be generated at low operating speeds.

In accordance with a further exemplary embodiment, the rotor can perform a rotary or linearly oscillating movement. The machine tool can therefore be configured as, for example, an angle grinder or straight grinder, screwdriver, drill, circular saw or in the form of a saw, for example a jigsaw, a saber saw, a crosscut saw or precision saw.

BRIEF DESCRIPTION OF THE DRAWINGS

Further features and advantages of the present disclosure will become apparent to a person skilled in the art from the description below relating to exemplary embodiments, which should not, however, be interpreted as being restrictive to the invention, with reference to the attached drawings.

FIGS. 3A, 3B show a generator with an accommodating flange as rotor, FIGS. 5A, 5B, 5C, 5D show different coil variants on the stator of the generator, FIG. 12 shows a cross section through a jigsaw.

Figure 1:
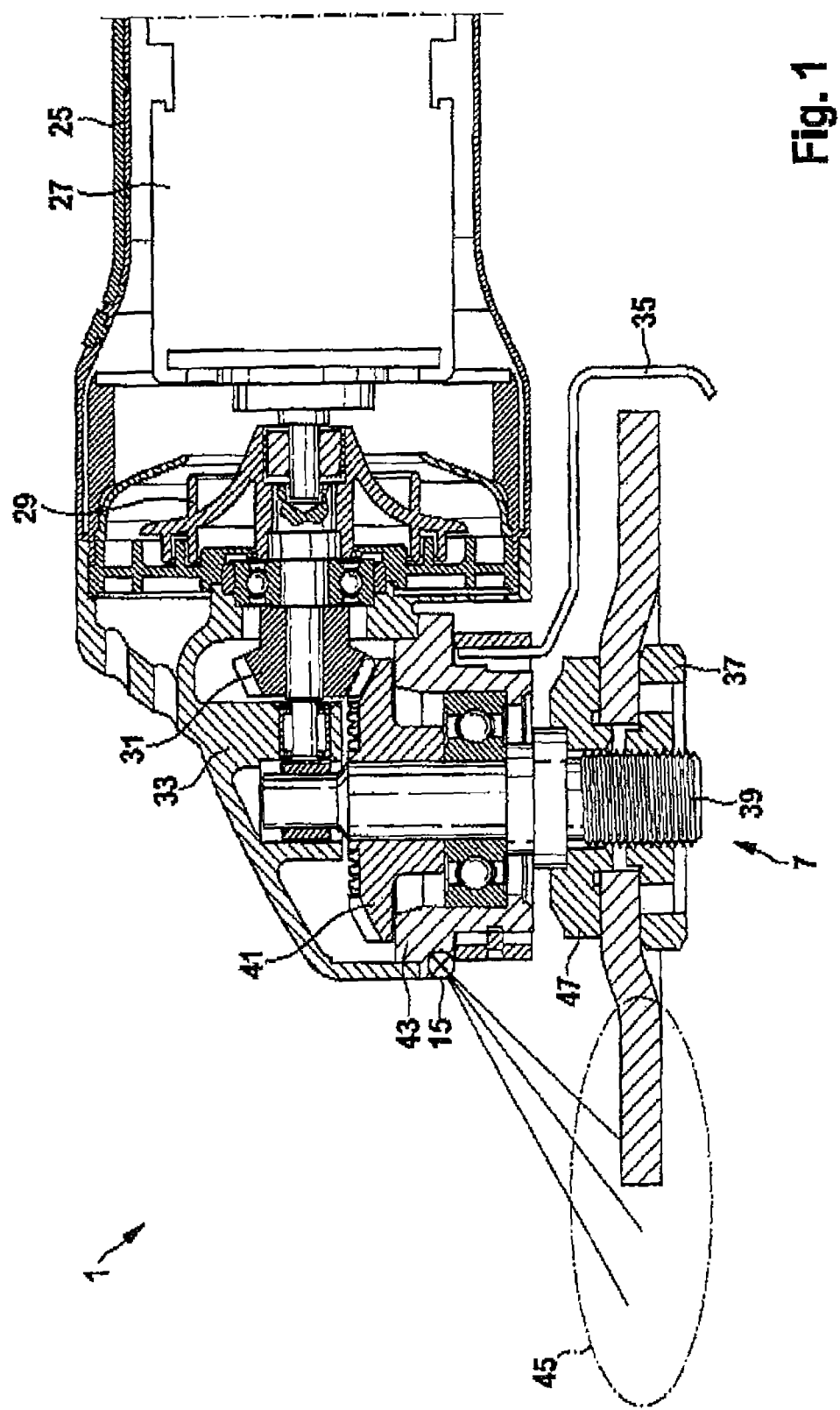
FIG. 1 shows a cross section through an angle grinder.

All of the figures are merely schematic illustrations of devices according to the disclosure or parts thereof. In particular, distances and size relationships have not been reproduced true to scale in the figures. Corresponding elements have been provided with the same reference numerals in the various figures.

DETAILED DESCRIPTION

FIGS. 1 to 11 illustrate the machine tool with a rotating rotor using the exemplary embodiment of an angle grinder, and FIGS. 12 to 17 illustrate the machine tool with a linearly oscillating rotor using the example of a jigsaw. FIGS. 1 to 7 show an exemplary embodiment of the generator with axial alignment of the magnetic lines of force in the air gap, and FIGS. 8 to 17 show an exemplary embodiment of the generator with radial alignment of the magnetic lines of force in the air gap. That is to say that, using the example of the angle grinder, the air gap flux in FIGS. 1 to 7 runs parallel to the axis of rotation of the generator and perpendicular to the axis of rotation of the generator in FIGS. 8 to 12.

FIG. 1 shows a schematic illustration of a cross section through an angle grinder 1. The angle grinder has the conventional components such as motor housing 25, motor 27, fan 29, pinion 31, gear housing 33, protective cover 35, two-hole nut 37, spindle 39, ring gear 41, bearing flange 43 and accommodating flange 47. A light source 15 can illuminate a working region 45 or the working area 45. The light source 15 can be integrated, for example, in the bearing flange 43. In the case of the angle grinder 1, the ring gear 41, the accommodating flange 47 or the spindle 39 can be used as the rotor 7.

Figure 2A:
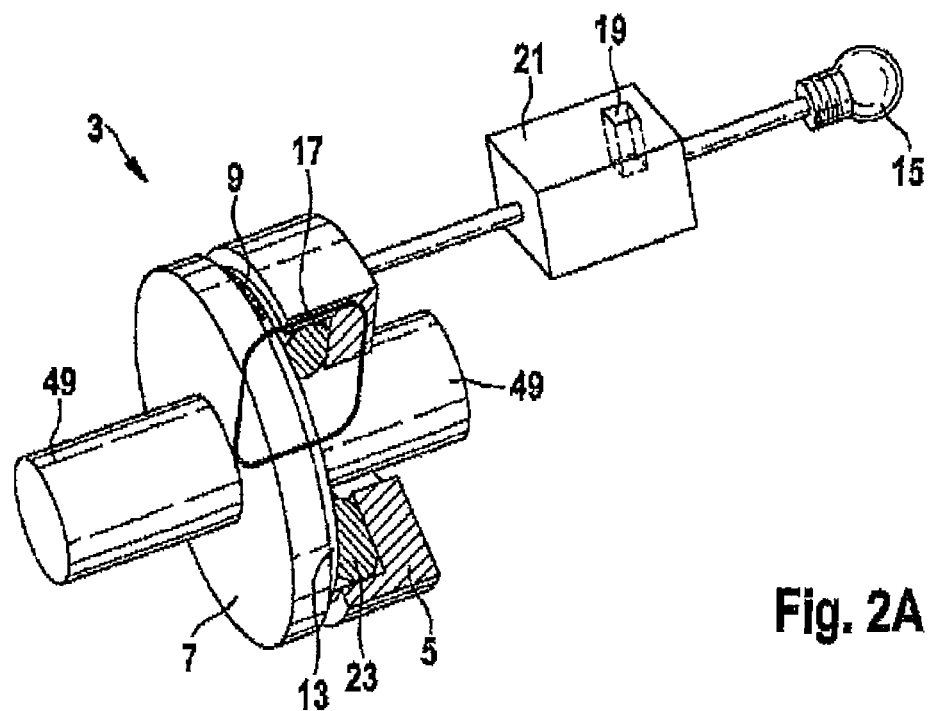
FIGS. 2A, 2B show a generator with axial alignment of the magnetic lines of force in the air gap.
Figure 2B:
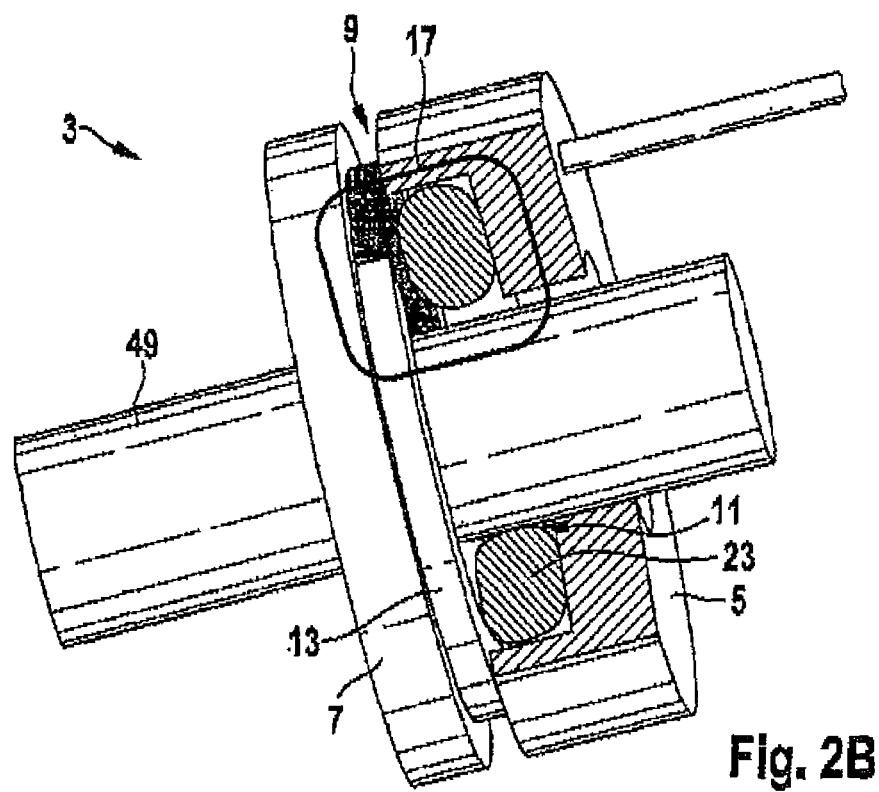

FIGS. 2A, 2B show a schematic illustration of a generator 3 with an axial alignment of the magnetic lines of force 17 in the air gap 9. FIGS. 2A and 2B show slightly different views and details of the generator 3. The rotor 7 is coupled to the output drive 49 of the angle grinder 1 and rotates relative to the stator 5. A coil 11 is arranged on the stator 5. The coil is wound around a yoke 23. A permanent magnet 13 is located on the rotor 7. During a rotation of the rotor 7, a voltage is induced in the coil 11. The magnetic lines of force 17 of the magnet 13 are guided in a targeted manner with respect to the coil 11 by the materials of the stator 5 and of the rotor 7 with a high relative permeability. The air gap 9, which has a low relative permeability, namely approximately 1, is designed to have very small dimensions, with the result that the rotor 7 can only just move relative to the stator 5. For example, the air gap 9, i.e. the distance between the stator 5 and the rotor 7, can be approximately 0.5 to 2 mm. The voltage induced in the coil 11 is passed on to a light source 15 via electronics 21 and an electrical energy store 19 integrated therein.

FIGS. 3A, 3B show a schematic illustration of a generator 3 with a rotor 7, which is in the form of an accommodating flange 47. FIGS. 3A and 3B show different perspectives of the generator 3. A plurality of permanent magnets 13 are arranged on the rotor 7. The permanent magnets are connected to one another by a magnetic return yoke 50, with the result that targeted guidance of the magnetic lines of force 17 is ensured. In the exemplary embodiment, the magnets 13 are embedded in the accommodating flange 47, are designed to be cylindrical and in the form of rods and are magnetized in the axial direction. In accordance with a further embodiment, it is possible for the magnetic return yoke 50 illustrated in FIGS. 3A, 3B not to be provided and for its function to be performed by the bearing flange 43 (see FIG. 1).

Figure 4A:
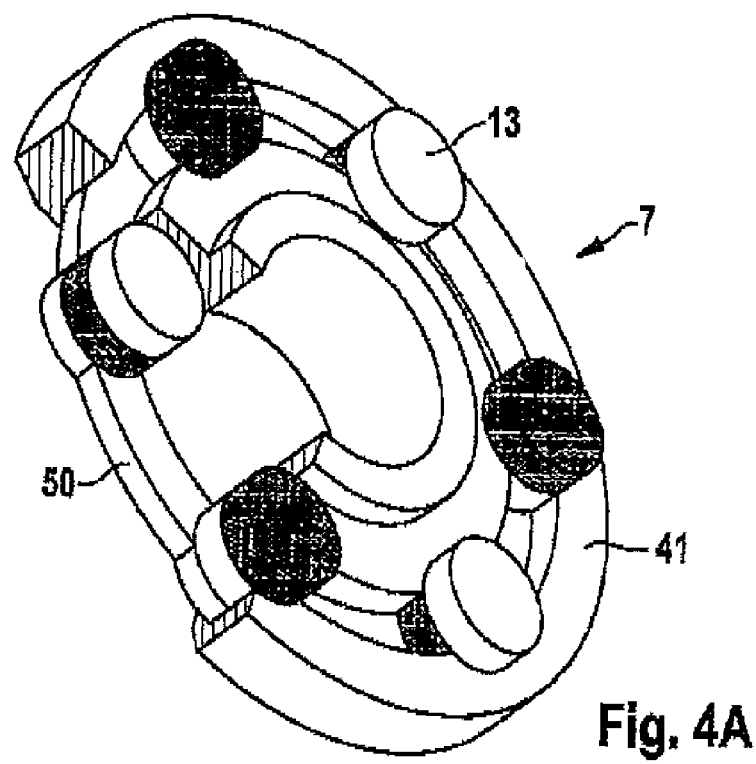
FIGS. 4A, 4B, 4C show a generator with a ring gear as rotor.
Figure 4B:
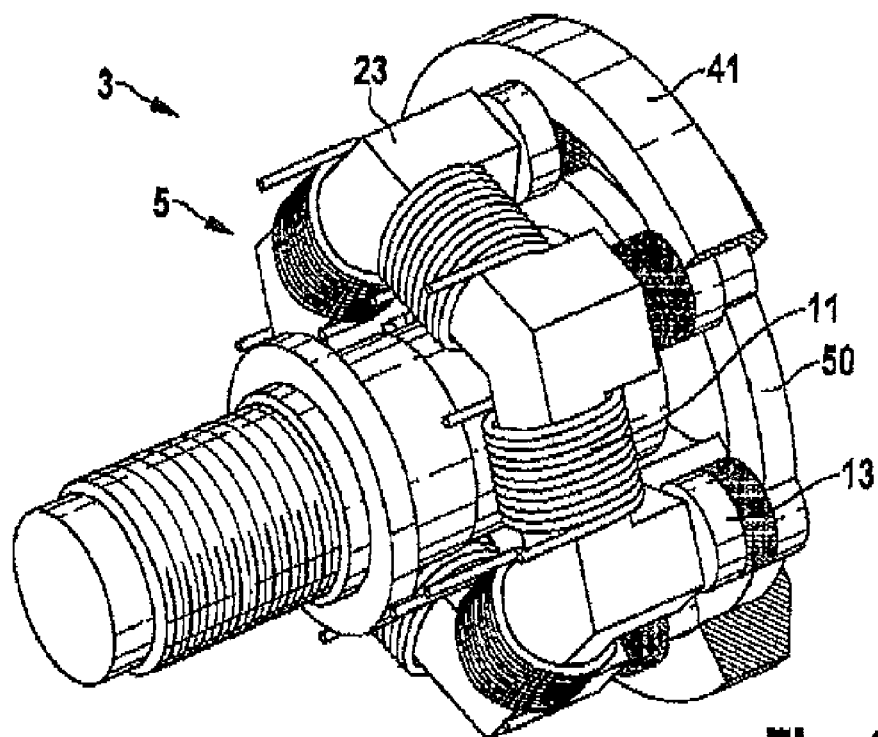
Figure 4C:
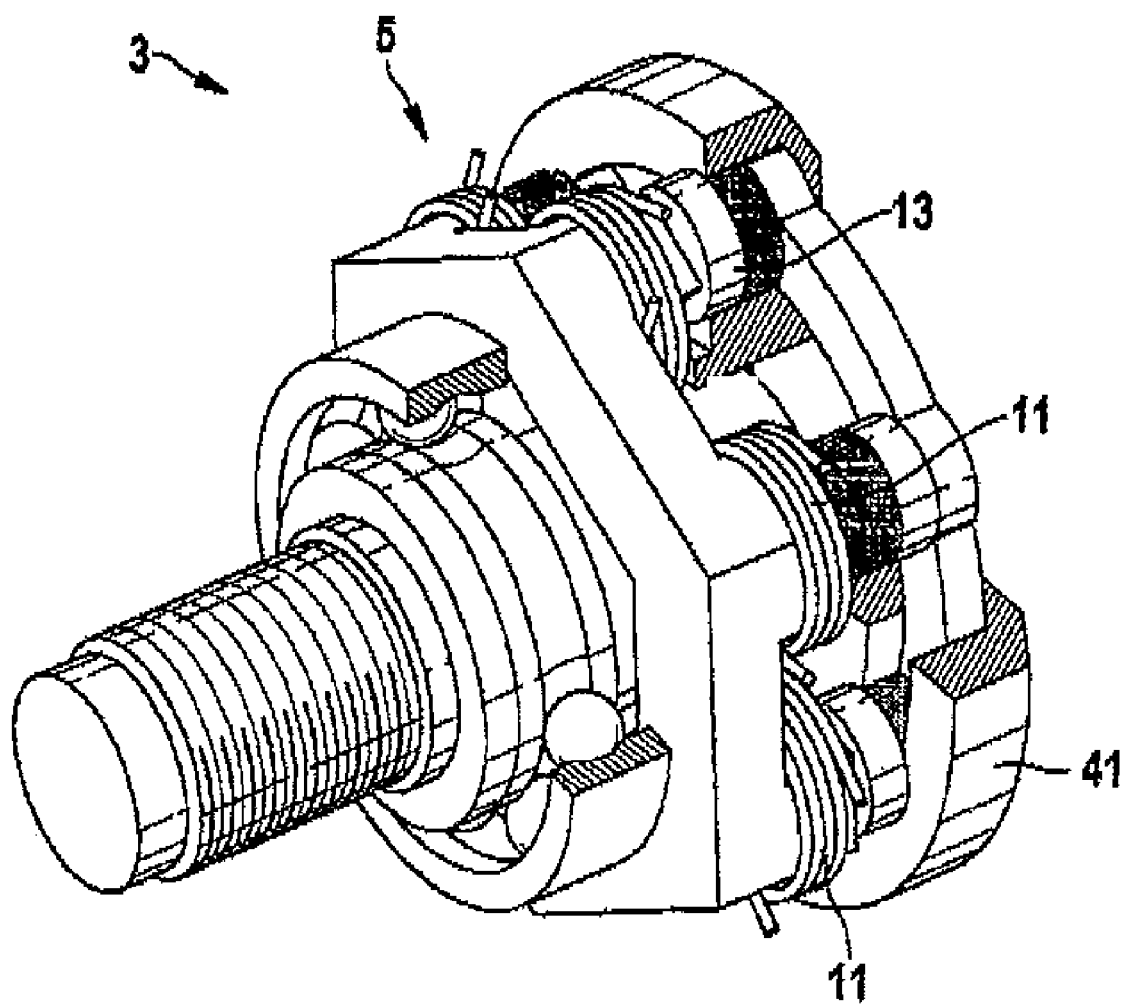

FIGS. 4A, 4B, 4C illustrate an exemplary embodiment of a generator 3 with a ring gear 41 as the rotor 7. Only the rotor 7 or some of the rotor 7 is illustrated in FIG. 4A. FIGS. 4B and 4C show the generator 3 from different perspectives. The yoke 23 of the stator 5 can be realized from individually stacked strips of sheet metal, as is indicated by the angular illustration. For example, magnetic sheet steel can be used for this purpose. In such a configuration, it is possible to achieve a situation in which radiofrequency losses are reduced and the magnetic permeability of the stator 5 is increased. In addition, the stator 5 can thus be divided into individual segments. Alternatively, the yoke 23 can consist of a solid material or can be replaced or supplemented by a suitable formation of the ring gear 41 which can direct the magnetic flux. Furthermore, as an alternative or in addition, a hybrid ring gear can be used, in which suitable materials/components are integrated in addition so as to optimize the magnetic flux.

FIGS. 5A, 5B, 5C, 5D illustrate different coil variants. In this case, the coils 11 can differ in terms of number, shape and arrangement, depending on the exemplary embodiment. For example, the coils 11, as illustrated in FIGS. 5A, 5C, can be located on the solid core of the yoke 23. Alternatively, the coils 11, as illustrated in FIGS. 5B, 5D and 4C, can be located on the "poles" of the stator 5. In FIGS. 5A, 5B, the yoke 23 consists of a solid material, and in FIGS. 5C, 5D it consists of a laminated material. In all of the exemplary embodiments, it is possible to use laminated and/or solid material.

Figure 6A:
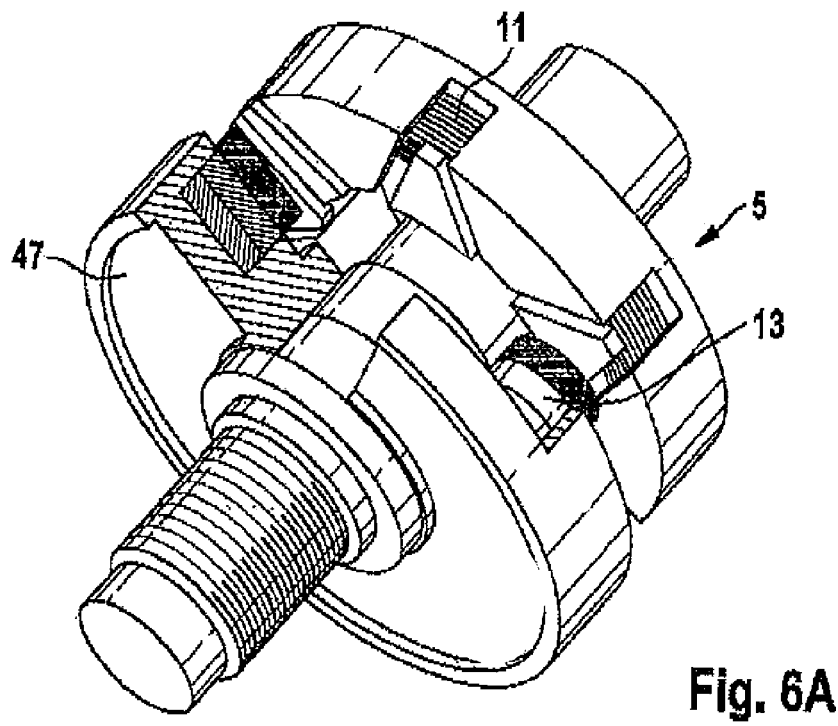
FIGS. 6A, 6B show a generator in the form of a claw-pole generator.
Figure 6B:
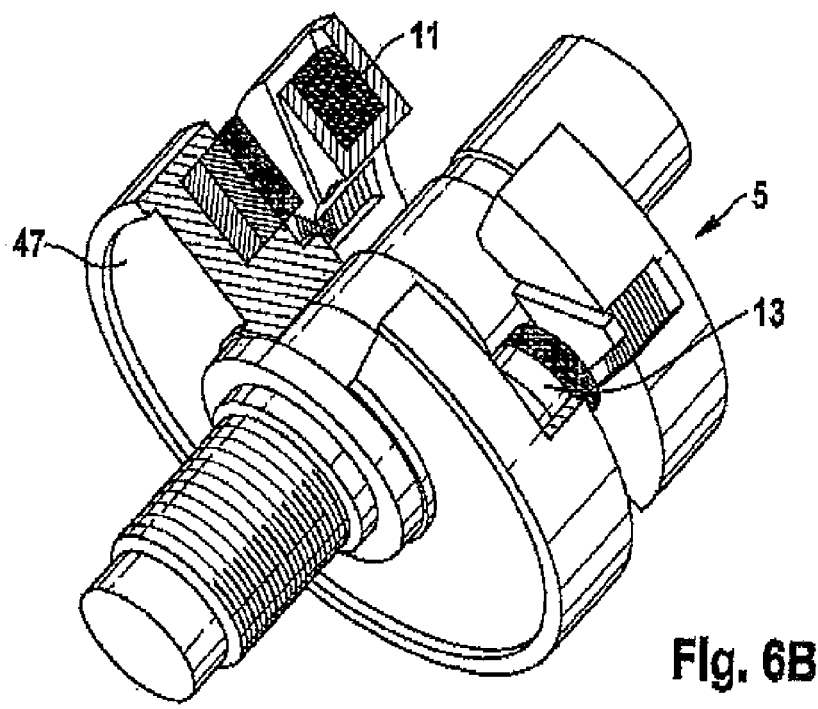
Figure 7A:
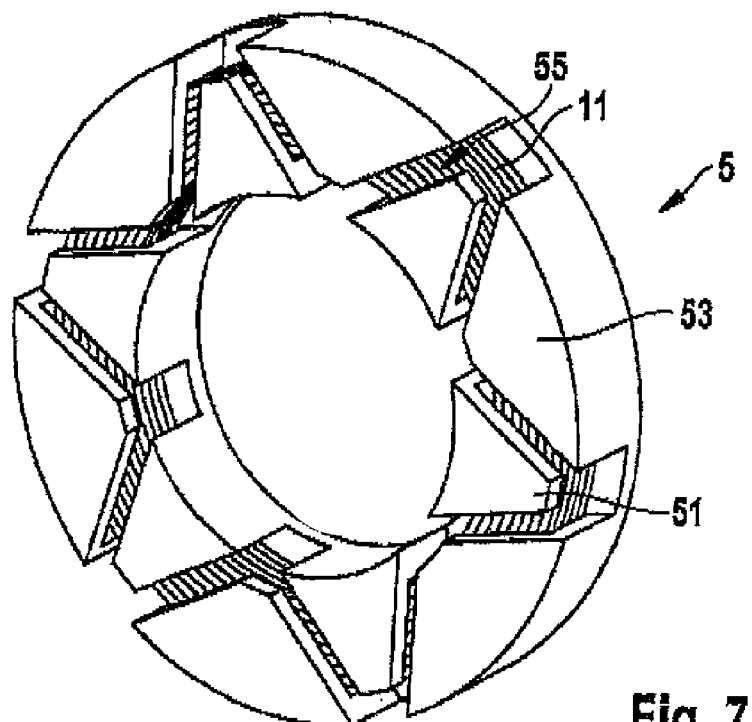
FIGS. 7A, 7B show an illustration of the stator of the claw-pole generator shown in FIGS. 6A, 6B, FIGS. 8A, 8B show a generator with radial alignment of the magnetic lines of force in the air gap.
Figure 7B:
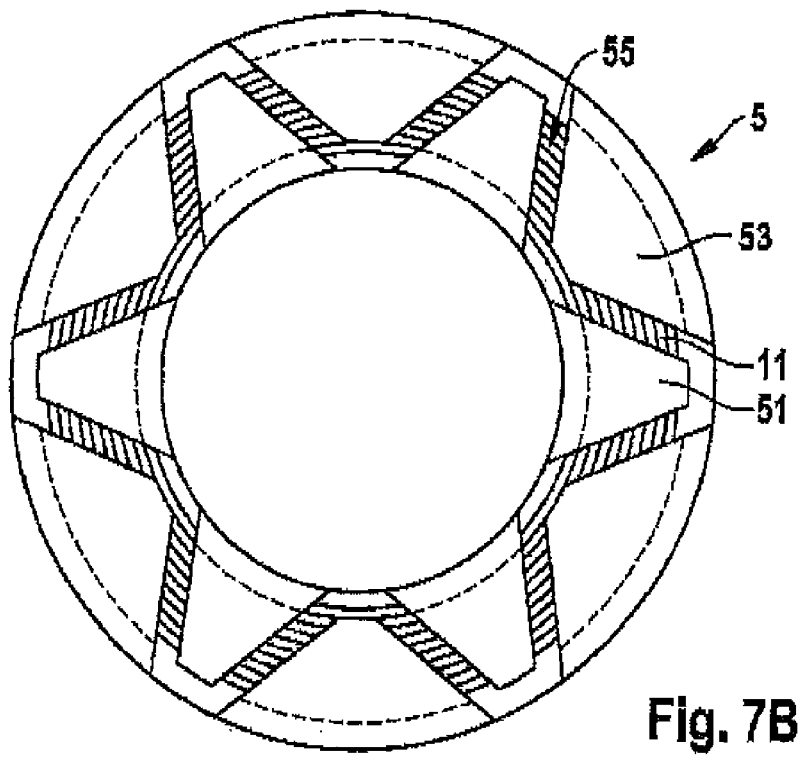

FIGS. 6A, 6B illustrate an embodiment of the generator 3 as a so-called claw-pole generator in different perspectives and details. It differs from the exemplary embodiments described above in that the stator 5 can be integrated in the gear housing and has, internally, a ring-shaped coil 11. The stator 5 of the claw-pole generator 3 is illustrated in different perspectives in FIGS. 7A, 7B. The claw-pole stator 5 has an inner pole 51 and an outer pole 53 with a stator pole air gap 55 between the poles 51, 53. During rotation of the accommodating flange 47, a rotating magnetic field is induced which is closed via the inner and outer poles 51, 53 and the stator air gap 55 and induces a voltage in the coil 11.

Figure 8A:
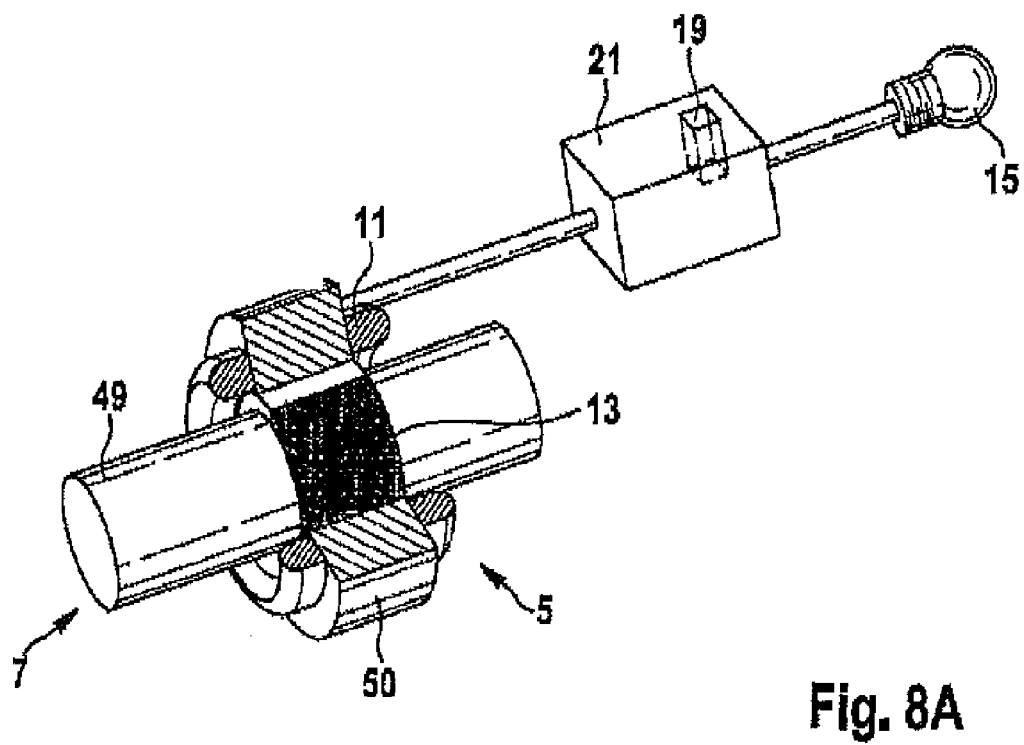
Figure 8B:
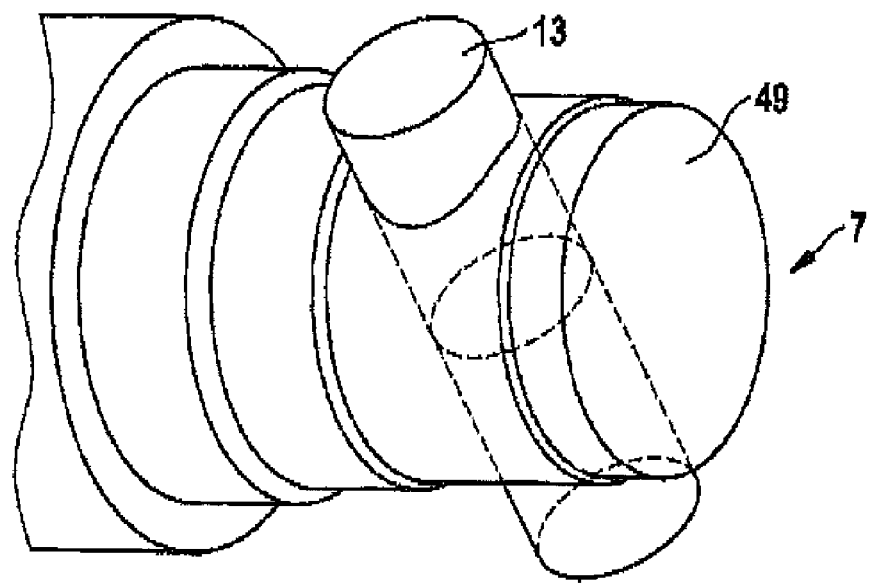

FIGS. 8A, 8B show a schematic illustration of a generator with radial or perpendicular alignment of the magnetic lines of force in the air gap. FIG. 8A shows an illustration of the generator 3, in analogy to FIG. 2A. It differs from FIG. 2A primarily in terms of the ring-shaped arrangement of the permanent magnet 13 on the rotor 7. The magnet 13 is arranged around the output drive 49 and is magnetized radially. The stator 5 with a magnetic return yoke 50 is arranged radially around the rotor 7. The magnet 13 can be installed in the output drive shaft 49 of the tool 1 as a permanent magnet pin (PMP) transversely with respect to the axis of rotation, as shown in FIG. 8B, for example. In the region of the PMP 13, the shaft can be graduated or thinner. As a result, so-called magnetic short circuits in which the magnetic flux does not assume the desired profile can be minimized In addition, a small radial physical volume can thus be achieved. In addition, when using a stator 5 consisting of magnetically conductive material, the efficiency of the energy generation, in particular at relatively low speeds of the generator 3, can be additionally increased.

Figure 9A:
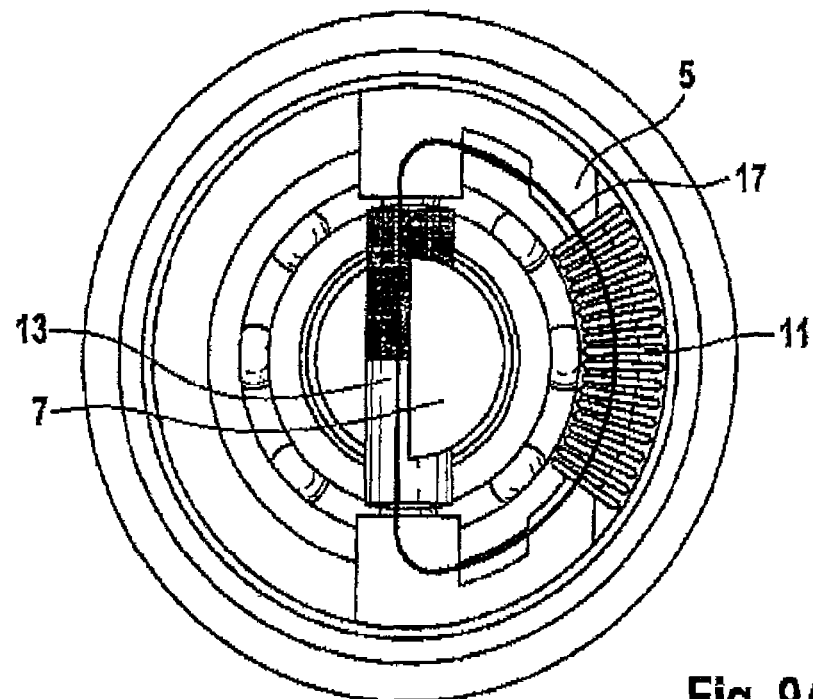
FIGS. 9A, 9B, 9C, 9D, 9E show embodiments of the stator in FIGS. 8A, 8B in the form of a horseshoe stator.
Figure 9B:
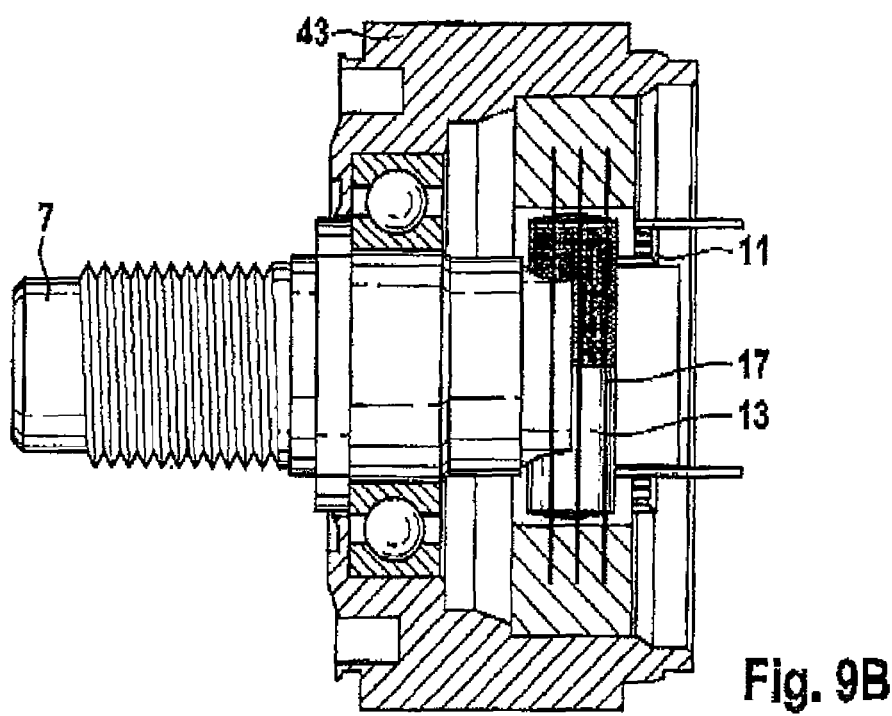
Figure 9C:
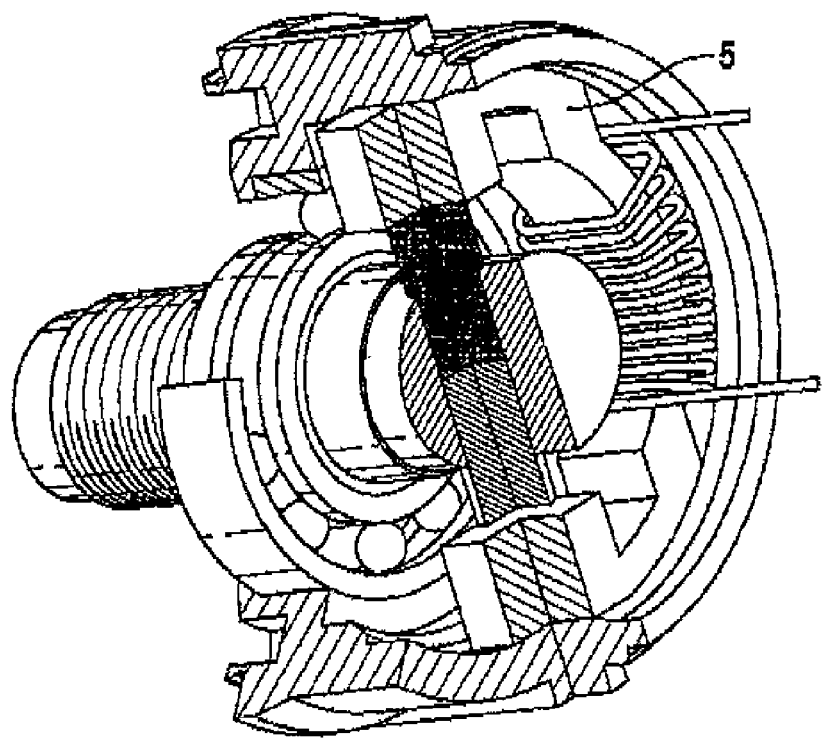
Figure 9D:
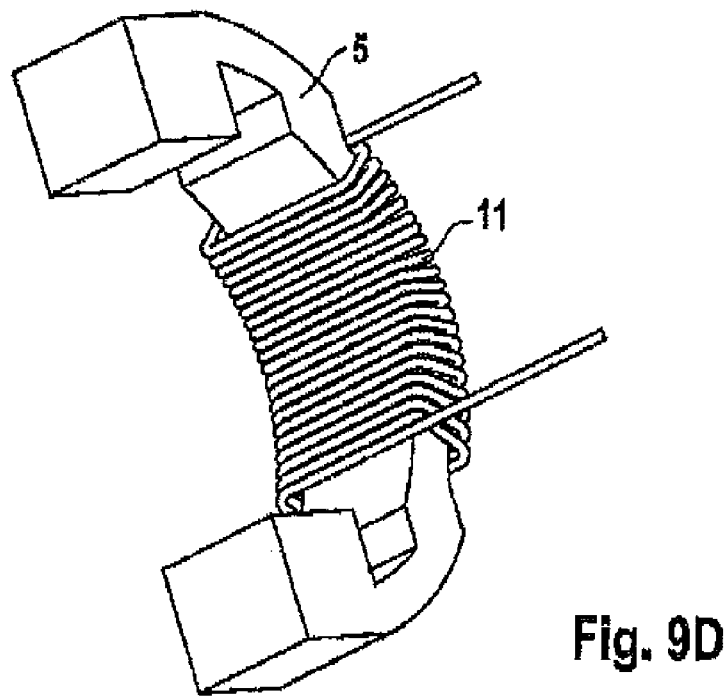
Figure 9E:
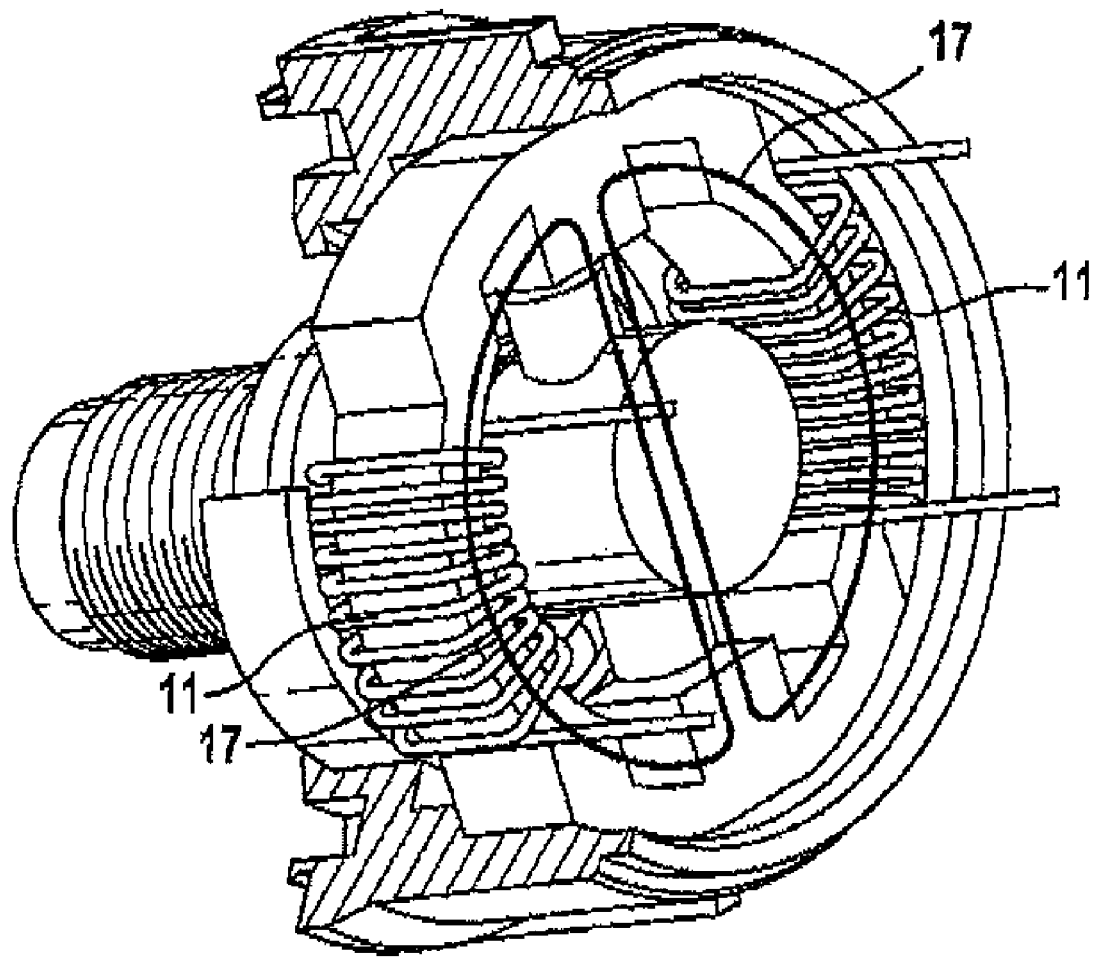

FIGS. 9A, 9B, 9C, 9D, 9E show a schematic illustration of possible embodiments of the stator 5 with a horseshoe shape for the generator 3 shown in FIGS. 8A, 8B. FIGS. 9A to 9D illustrate different views and components of the generator 3 with a single horseshoe stator 5. FIG. 9E illustrates the generator 3 with a double horseshoe stator 5. A symmetrical configuration of the horseshoe stator 5 increases the energy efficiency. By corresponding wiring of the coils 11, for example via the electronics 21, it is possible for the power to be increased. In this case, for example, it is possible for voltage summation to be performed via a rectifier. In this case, the stator 5 can be configured with one or more parts. By virtue of a multipart configuration, the fitting in particular of the coils 11 can be simplified and therefore production costs reduced.

Figure 10A:
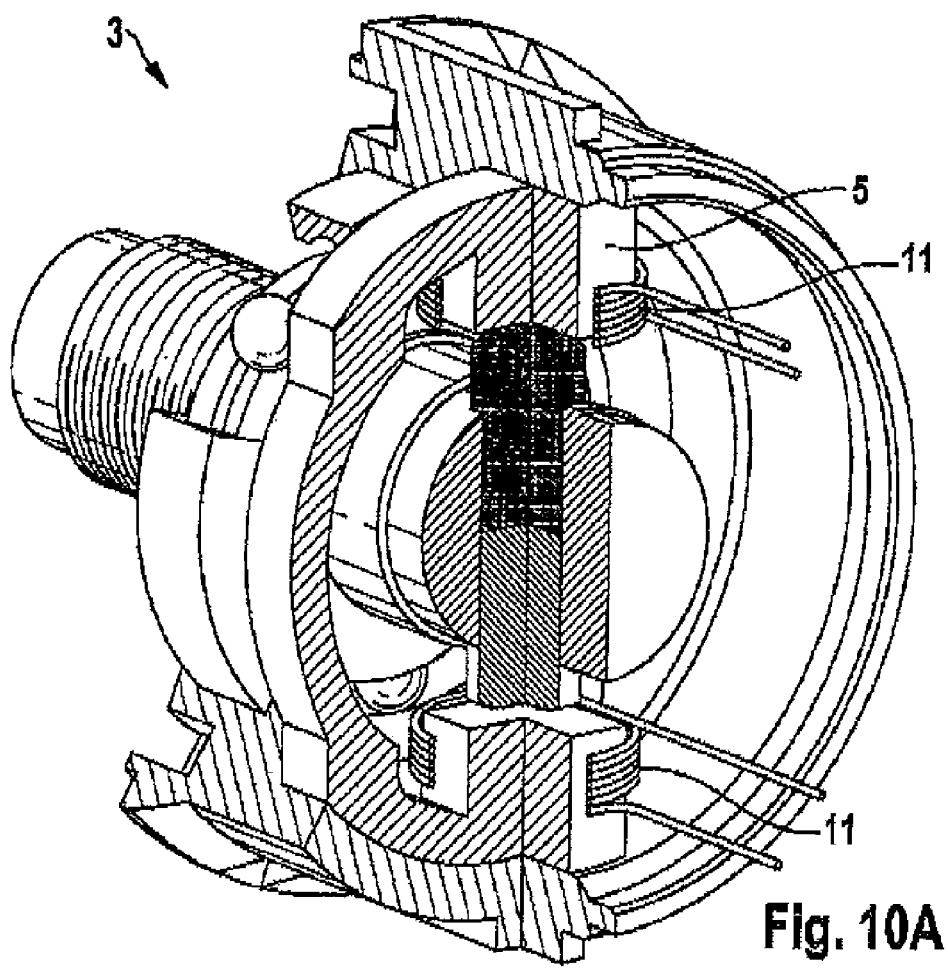
FIGS. 10A, 10B show further embodiments of the stator in FIGS. 8A, 8B, FIGS. 11A, 11B, 11C, 11D, 11E, 11F, 11G, 11H show a further embodiment of the generator from FIGS. 8A, 8B.
Figure 10B:
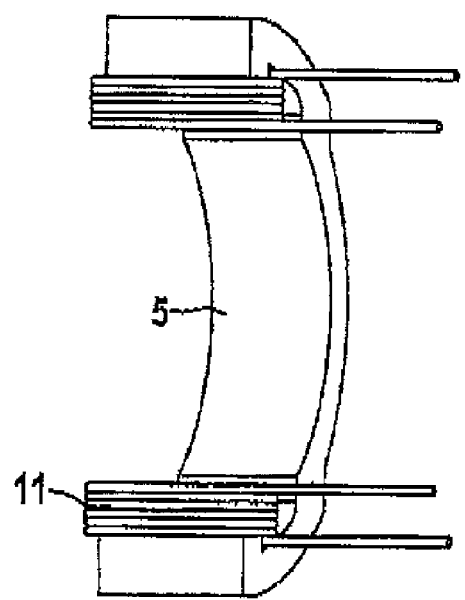
Figure 11A:
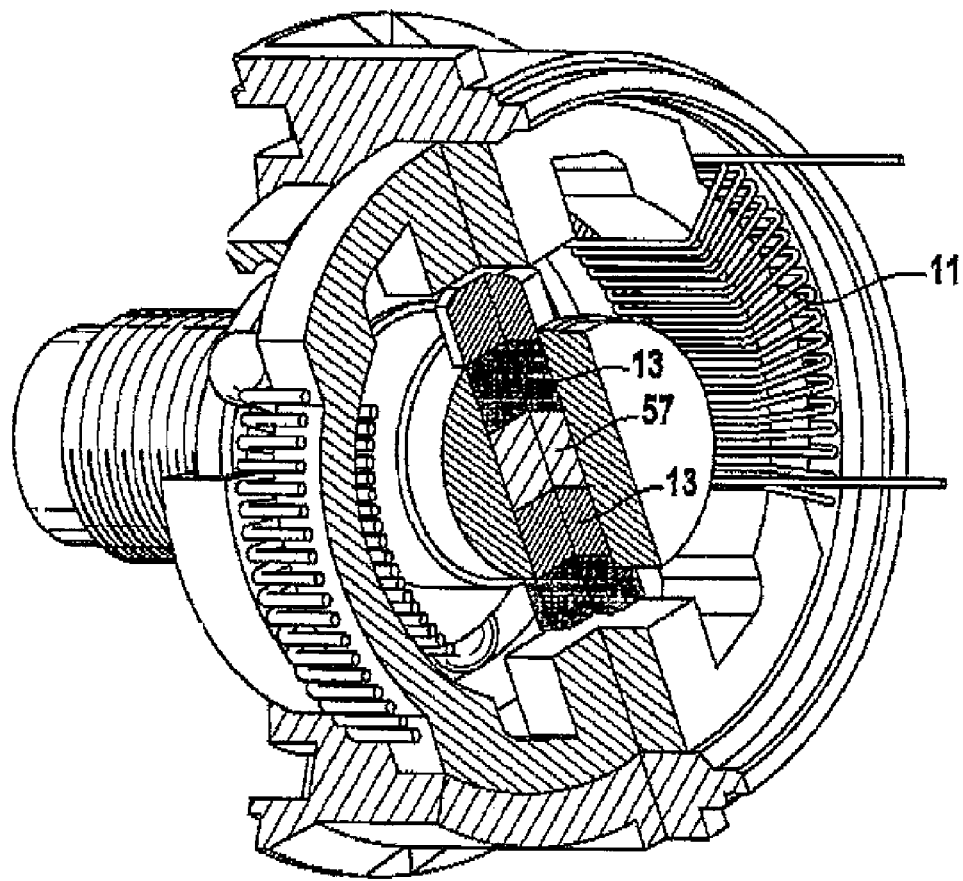
Figure 11B:
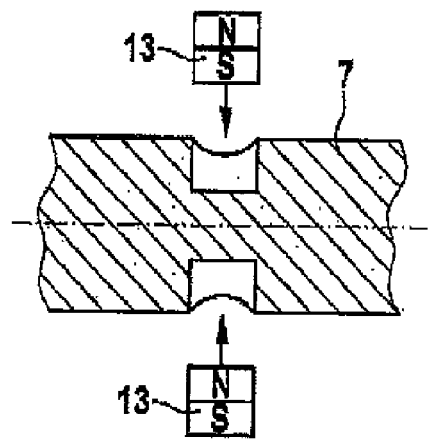
Figure 11C:
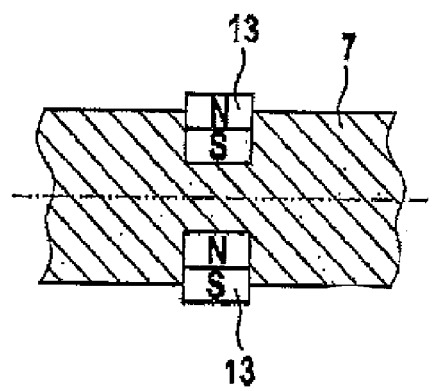
Figure 11D:
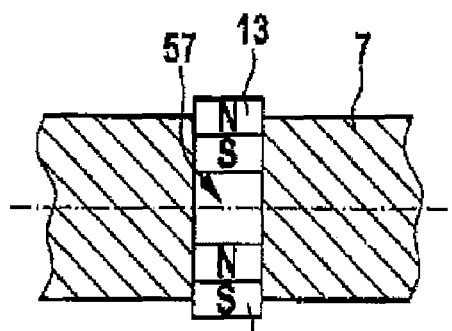
Figure 11E:
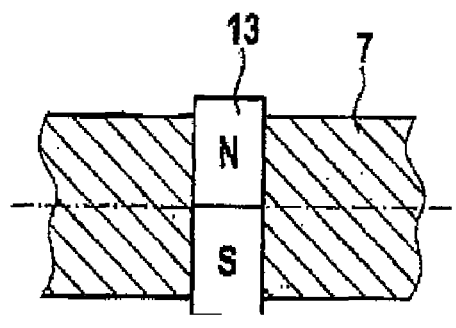
Figure 11F:
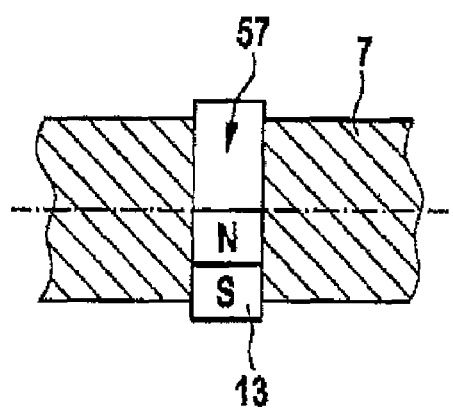
Figure 11G:
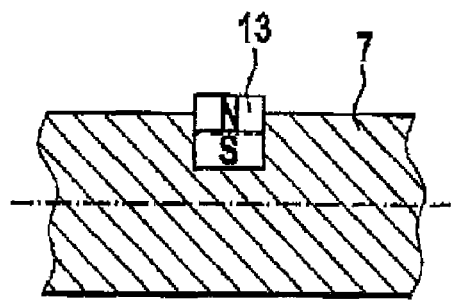
Figure 11H:
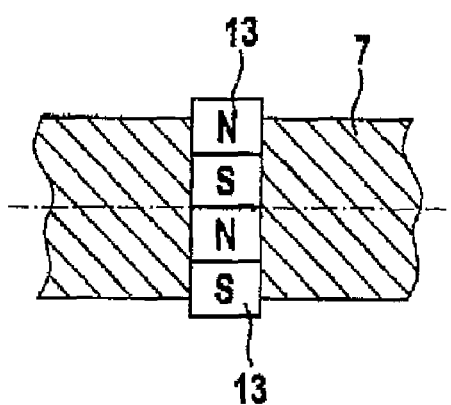

As illustrated in FIGS. 10A, 10B, the coil 11 can be arranged on the pole core in the case of a horseshoe stator 5 as well. As a result, the width of the stator 5 can be reduced and well. In addition, such a configuration is simpler in terms of production. FIG. 10A shows the generator 3 in a perspective illustration. FIG. 1 OB merely illustrates the horseshoe stator 5 with coils 11.

FIGS. 11A, 11B, 11C, 11D, 11E, 11F, 11G, 11H show schematic illustrations of a further embodiment of the generator 3 from FIGS. 8A, 8B. In contrast to FIGS. 9A-9D, the rotor 7 of the generator 3 has two magnets 13, which are isolated from one another by a metal pin 57, so as to increase the permeability. The metal pin 57 has a high magnetic permeability. By virtue of connecting the magnet 13 or magnets 13 and the metal pin 57 in series with one another, it is possible to reduce the magnet volume and therefore to save on costs. In addition, this also enables a simpler design. FIG. 11B to 11H illustrate alternative possibilities for the integration of magnets 13 and metal pins 57, such as ferromagnetic pins, for example, in the rotor 7.

FIG. 12 shows a schematic illustration of a cross section through a machine tool 1 in the form of a jigsaw. The jigsaw 1 has a lifting rod 59, which can move linearly up and down. The magnets 13, together with the lifting rod 59, can form the rotor 7. The stator 5 is arranged around the lifting rod 59. The light source 15 illuminates a working area 45 during operation of the rotor 7. The lifting rod 59 and the saw blade 61 arranged thereon perform a linearly oscillating movement 63 (indicated by an arrow).

Figure 13A:
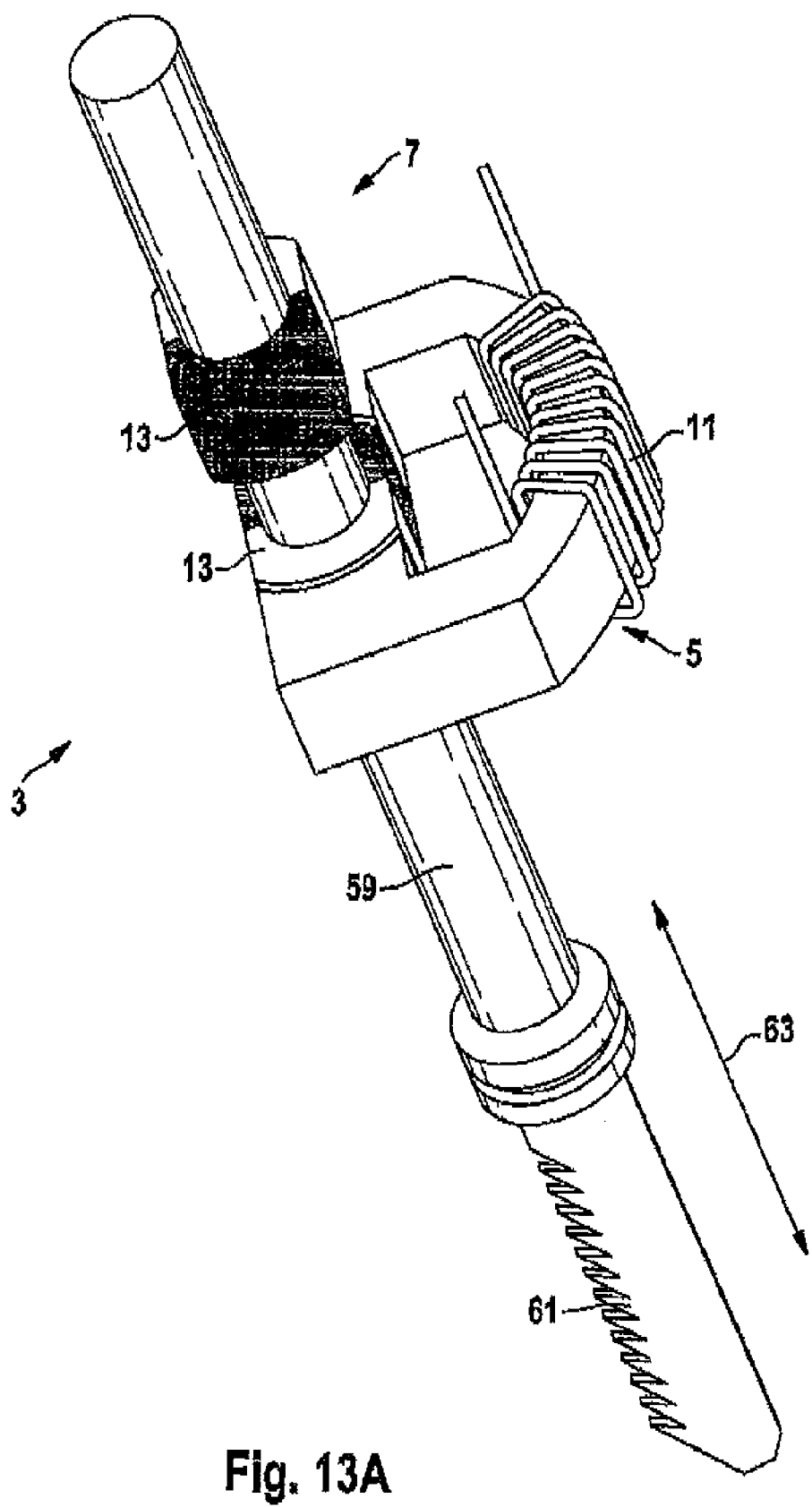
FIGS. 13A, 13B, 13C, 13D show a generator with a radial alignment of the magnetic lines of force in the air gap.

FIGS. 13A, 13B, 13C, 13D show a schematic illustration of a generator 3 of the jigsaw 1. FIG. 13A shows a perspective illustration of the generator 3. Two permanent magnets 13, which are arranged at a certain distance from one another and have different polarity, are located on the lifting rod 59. The magnets 13 are in the form of rings. The stator 5 with the coil 11 is in the form of a horseshoe.

Figure 13B:
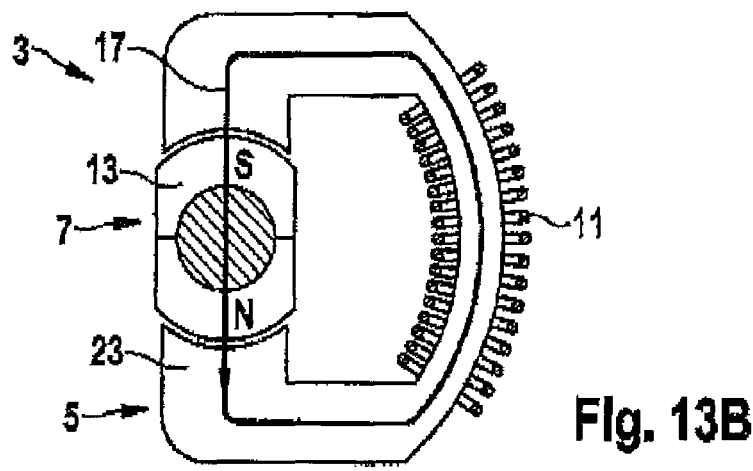
Figure 13C:
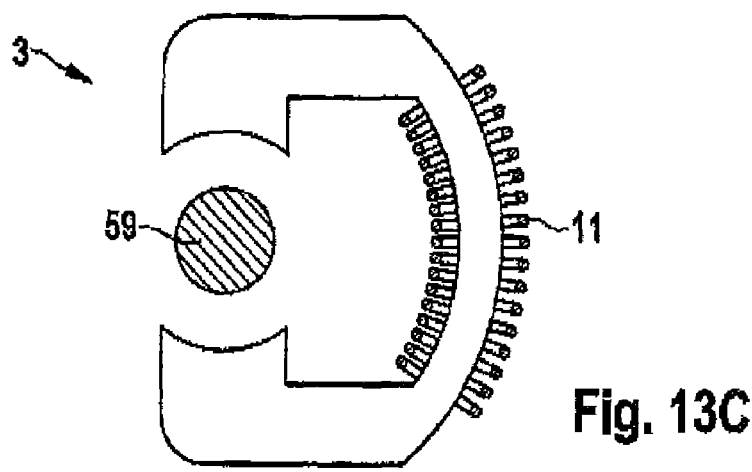
Figure 13D:
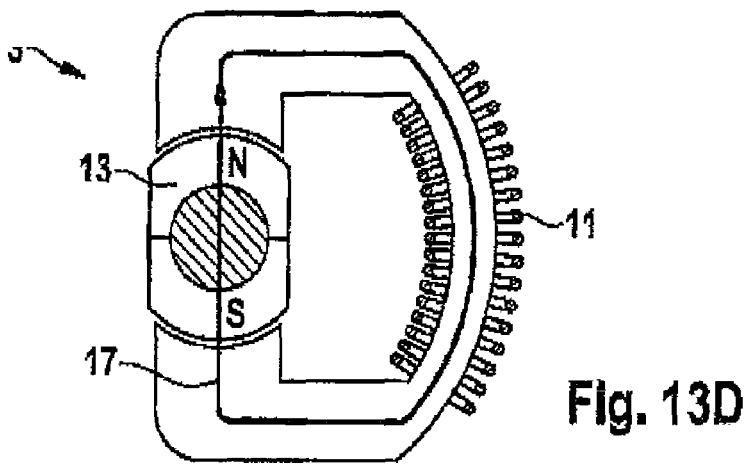

FIGS. 13B to 13D illustrate cross sections through the generator 3 in different phases of the linearly oscillating movement 63 of the lifting rod 59. In FIG. 13B, one of the permanent magnets 13 is located in the region of the stator 5. The magnetic lines of force 17 are directed in a targeted manner with respect to the coil 11, starting from the magnet 13 through the yoke 23 of the stator 5. In FIG. 13C, the region of the lifting rod 59 between the magnets 13 is located at the level of the stator 5. In the illustration shown in FIG. 13C, there is no magnetic field and no voltage is induced in the coil 11. In FIG. 13D, the other permanent magnet 13 with a different orientation of the poles is located in the region of the stator 5. The magnetic flux 17 is in opposition to that in FIG. 13B.

By virtue of the alternating movement of the rotor 7 and the opposite magnetic orientation of the magnets 13, the voltage induced in the coil 11 is alternating. The magnet rings 13 are tapered laterally, as is illustrated in the cross sections in FIGS. 13B and 13D. That is to say that the magnets 13 are thicker on the sides oriented towards the stator 5 than on the sides which are located further away from the stator 5. By virtue of the lateral tapering of the magnets 13, leakage fluxes are reduced and a large proportion of the magnetic lines of force runs through the yoke 23.

Figure 14A:
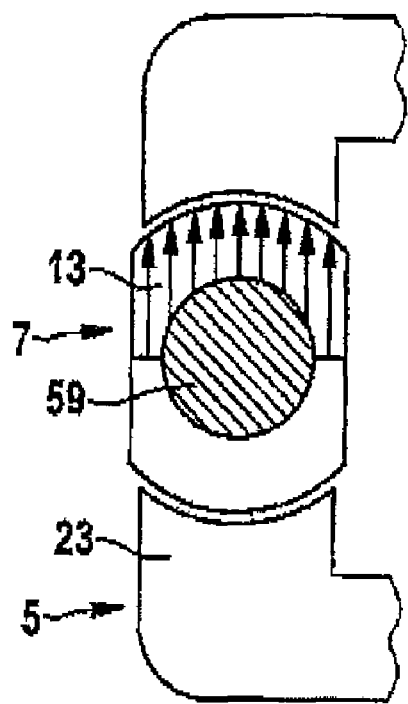
FIGS. 14A, 14B show possible magnetizations of the permanent magnet rotor.
Figure 14B:
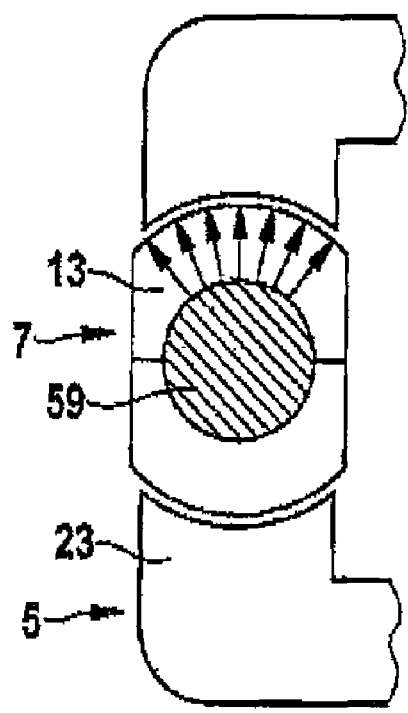

As illustrated in FIGS. 14A, 14B, the magnets 13 can be magnetized transversely or radially. FIG. 14A shows a magnet 13 with transverse magnetization. FIG. 14B shows a magnet 13 with radial magnetization.

Figure 15A:
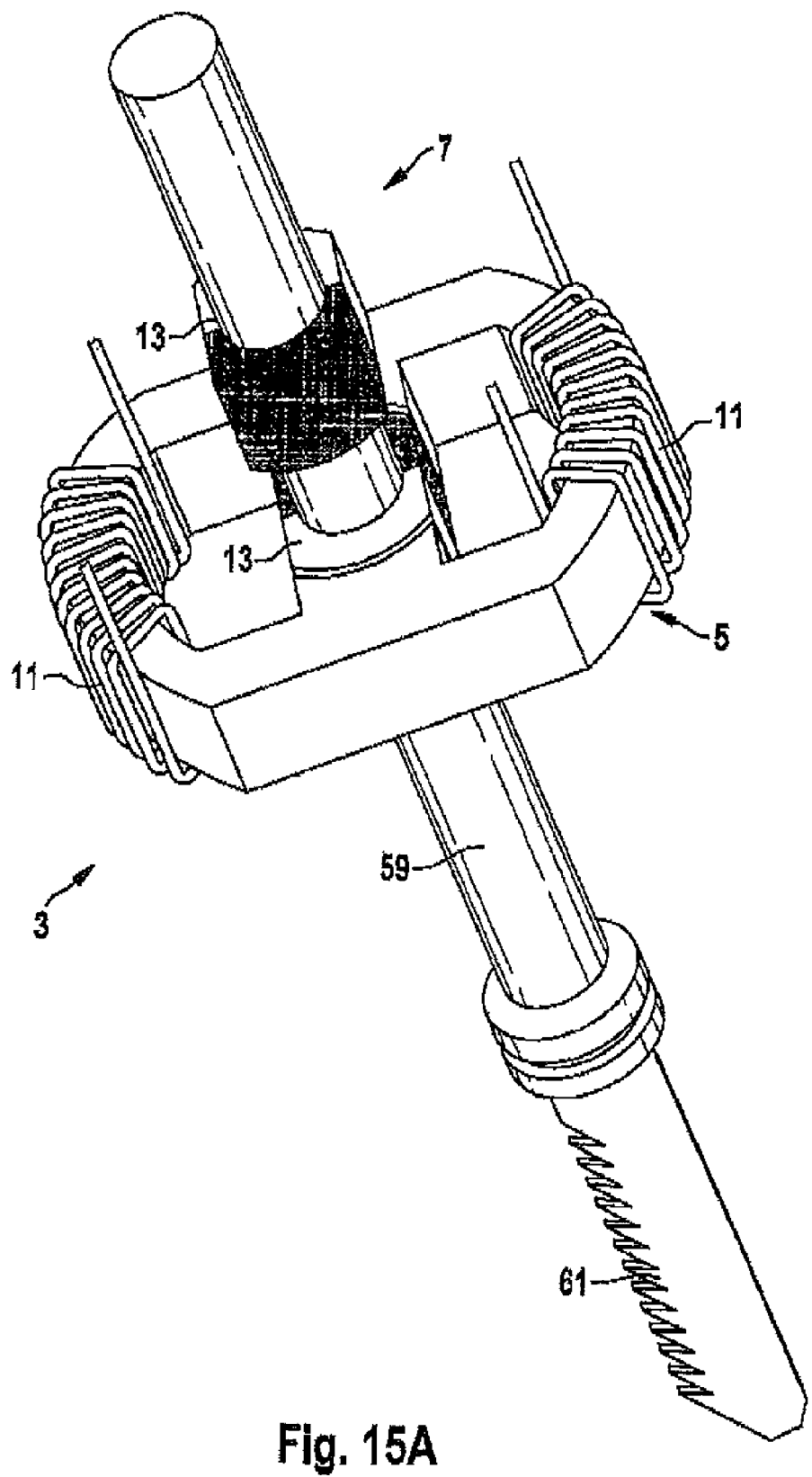
FIGS. 15A, 15B show an embodiment of the generator with a horseshoe stator with a double yoke.
Figure 15B:
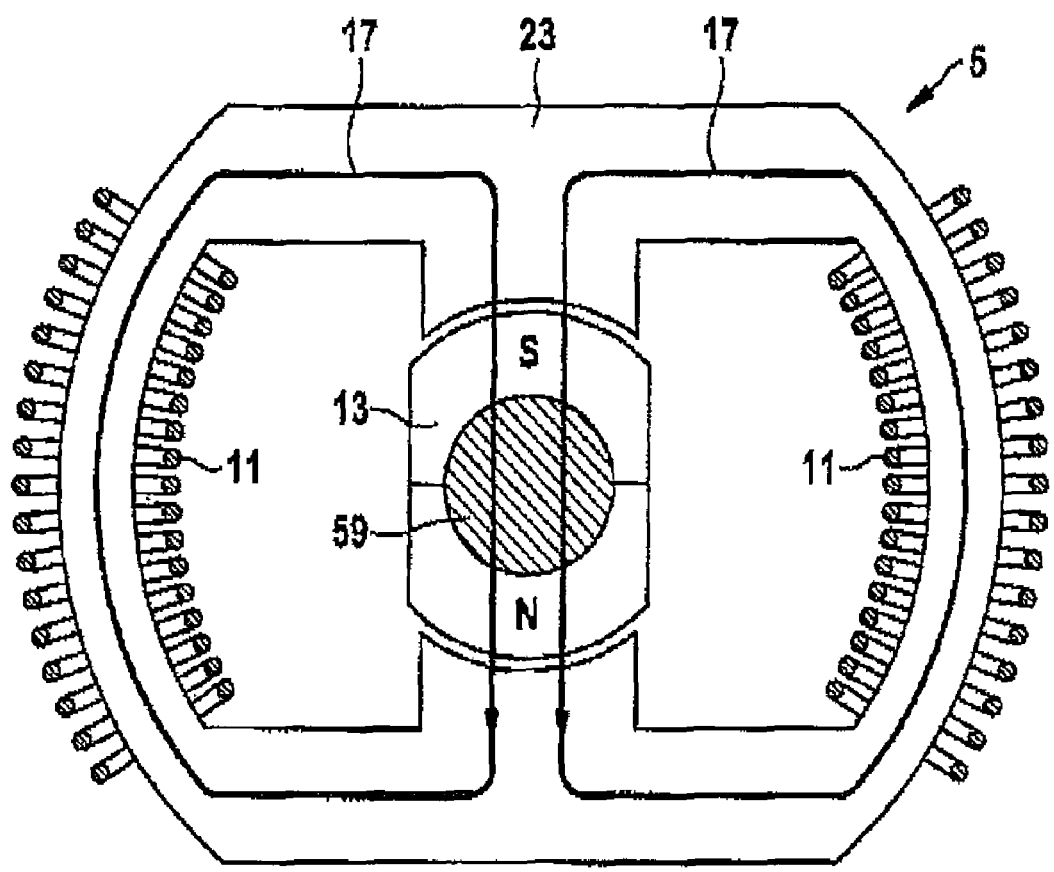

FIGS. 15A, 15B show the embodiment of the generator with a horseshoe stator 5 with a double yoke 23. FIG. 15A shows a perspective illustration of the exemplary embodiment. FIG. 15B shows a cross section through the generator 3. By virtue of the coils 11 being connected in series, the induced voltage can be increased.

Figure 16A:
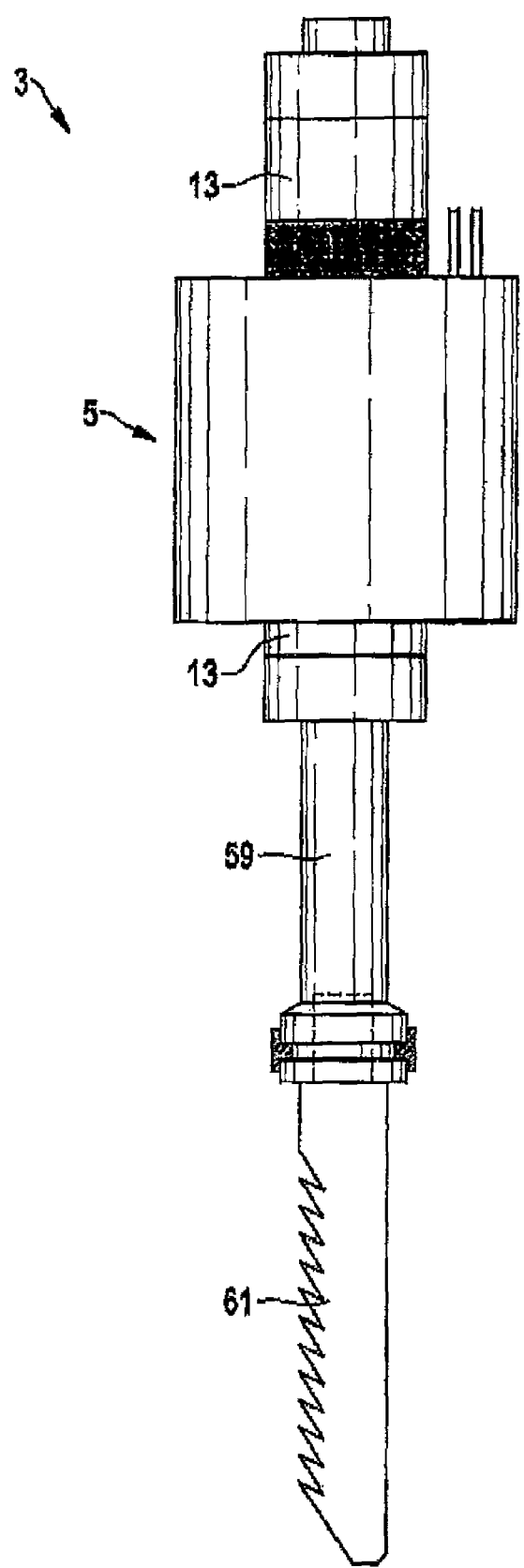
FIGS. 16A, 16B show an embodiment of the generator with a cylindrical coil.
Figure 16B:
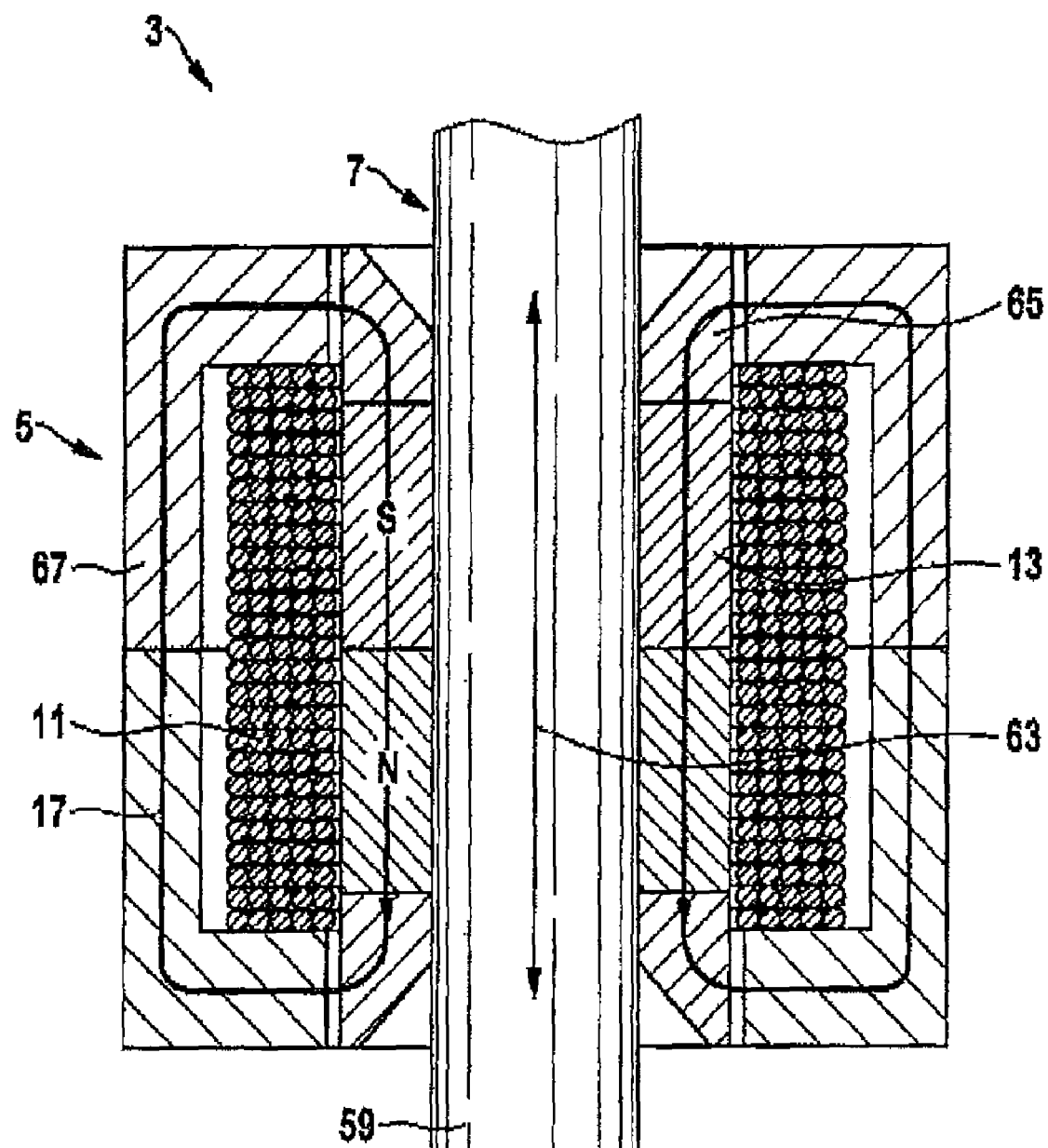

FIGS. 16A, 16B illustrate the generator 3 with a cylindrical coil 11 in a stator housing 67. FIG. 16A shows a plan view of the generator 3. FIG. 16B shows a cross section through the generator 3. The stator housing 67 comprises a material with good magnetic permeability or consists of such a material. Terminating rings 65, which direct the magnetic flux from the magnet to the stator housing 67, are located at both ends of the magnet 13. By virtue of a beveled surface, also referred to as chamfer, of the terminating rings 65 on that edge facing the lifting rod 59, the number of magnetic lines of force 17 entering the lifting rod 59 is reduced. In addition, the flux is thus focused and is therefore directed in a targeted manner through the stator housing.

The induced voltage can be increased by virtue of the number of permanent magnets 13 on the rotor 7 and/or the number and configuration of the coils 11 on the stator 5 being varied. By virtue of a corresponding arrangement and magnetization direction of the magnets 13, it is possible for an alternating voltage to be induced in the coil 11. The axial dimensions of the rotor components and those of the stator 5 are matched to one another in such a way that a maximum possible alternating voltage can be induced.

Figure 17C:
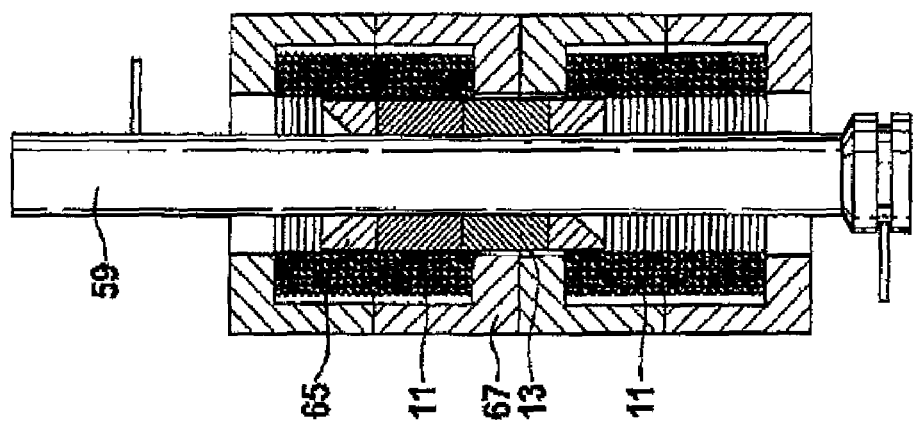
FIGS. 17A, 17B, 17C show further exemplary embodiments of the generator with cylindrical coils.
Figure 17B:
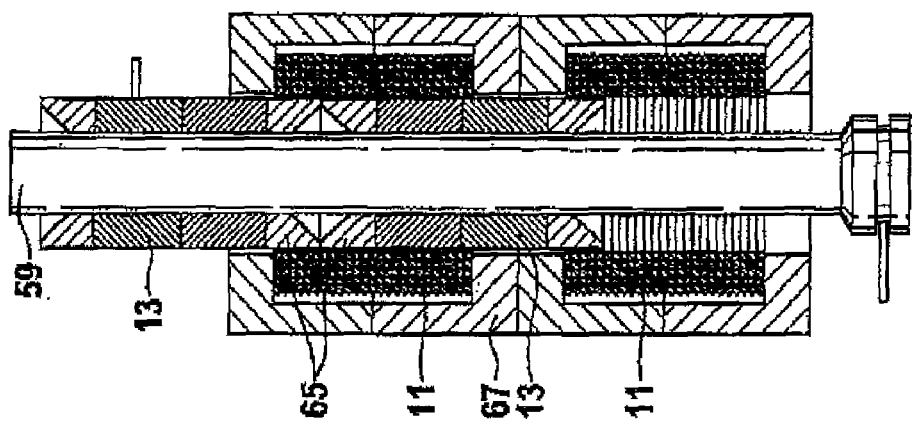
Figure 17A:
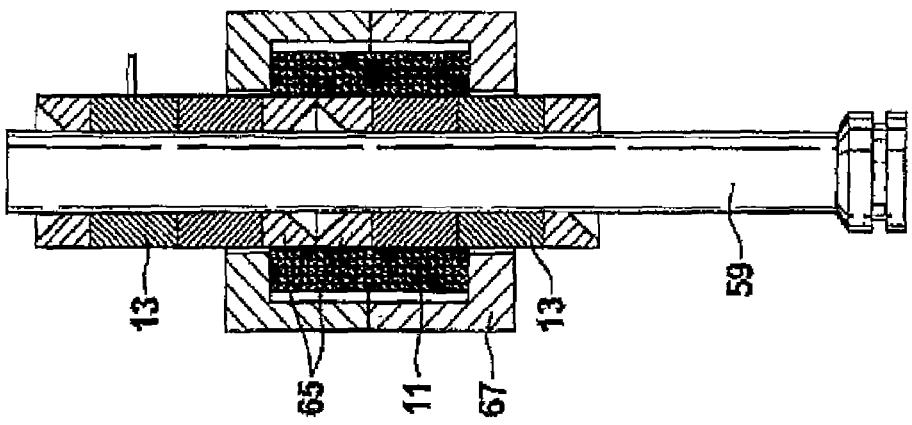

The embodiment shown in FIG. 17A illustrates a coil 11 and two magnets 13. FIG. 17B illustrates two coils 11 and two magnets 13. FIG. 17C illustrates two coils 11 and one magnet 13.

By way of conclusion it should be noted that expressions such as "having" or the like are not intended to rule out the possibility of further elements or steps being provided. Furthermore, the use of "one" or "a" is not intended to rule out a greater number. In addition, features described in connection with the various embodiments can be combined with one another as desired.

What is claimed is:

1. A machine tool, comprising:
   a generator configured to generate electrical power, said generator including:
      a stator, and
      a rotor configured to move relative to the stator,
      a coil arranged on the stator, and
      a magnet arranged on the rotor,
   wherein an air gap is formed between the rotor and the stator,
   wherein the stator and the rotor comprise a material with a relative permeability greater than the relative permeability of air and are arranged such that magnetic lines of force of the magnet are guided in a targeted manner with respect to the coil, and
   wherein the air gap between the stator and the rotor is configured such that a large proportion of the lines of force emanating from the magnet are guided by the stator and the rotor.

2. The machine tool according to claim 1, wherein at least one of the stator and the rotor comprises a ferromagnetic material.

3. The machine tool according to claim 1, further comprising an output drive, wherein:
   the rotor is coupled to the output drive.

4. The machine tool according to claim 1, further comprising a first circuit, wherein:
   the coil has a second circuit, and
   the first circuit is electrically isolated from the second circuit.

5. The machine tool according to claim 1, further comprising a light source, wherein:
   the light source is electrically connected to the coil such that electrical energy is supplied to the light source during movement of the rotor.

6. The machine tool according to claim 5, wherein:
   the light source is electrically connected to the coil such that the light source emits a light signal during movement of the rotor, and
   the light signal varies depending on a present rotation speed of the rotor.

7. The machine tool according to claim 5, wherein the light source is a laser light source.

8. The machine tool according to claim 1, further comprising an electrical energy store, wherein:
   the coil is electrically connected to the electrical energy store.

9. The machine tool according to claim 1, further comprising:
   a yoke configured to intensify the magnetic flux, said yoke being arranged on the coil; and
   a magnetic return yoke arranged on the magnet.

10. The machine tool according to claim 1, wherein the rotor is configured to perform one of a rotary movement or a linearly oscillating movement.

11. The machine tool according to claim 1, wherein the machine tool is one of an angle grinder and a saw.

12. The machine tool according to claim 1, wherein both the stator and the rotor comprise a ferromagnetic material.

* * * * *